(12) United States Patent
Utsunomiya et al.

(10) Patent No.: US 7,864,199 B2
(45) Date of Patent: Jan. 4, 2011

(54) IMAGE PROCESSING APPARATUS AND CONTROL METHOD THEREOF

(75) Inventors: Takehito Utsunomiya, Kawasaki (JP); Masakazu Kitora, Kawasaki (JP)

(73) Assignee: Canon Kabushiki Kaisha (JP)

( * ) Notice: Subject to any disclaimer, the term of this patent is extended or adjusted under 35 U.S.C. 154(b) by 763 days.

(21) Appl. No.: 11/772,790

(22) Filed: Jul. 2, 2007

(65) Prior Publication Data
US 2008/0122864 A1    May 29, 2008

(30) Foreign Application Priority Data
Jul. 6, 2006 (JP) .............................. 2006-186973

(51) Int. Cl.
*G09G 5/00* (2006.01)
(52) U.S. Cl. ..................... 345/629; 345/619
(58) Field of Classification Search ................ 345/619, 345/629
See application file for complete search history.

(56) References Cited

U.S. PATENT DOCUMENTS 6,940,526 B2 * 9/2005 Noda et al. ................. 345/629
2005/0073529 A1 * 4/2005 Gu ............................. 345/589
2005/0225566 A1 * 10/2005 Kojo .......................... 345/629
2007/0057933 A1 * 3/2007 Ohno et al. ................. 345/204
2010/0045691 A1 * 2/2010 Naito et al. ................. 345/629

FOREIGN PATENT DOCUMENTS

JP    2005-157449 A    6/2005

* cited by examiner

*Primary Examiner*—Chante Harrison
(74) *Attorney, Agent, or Firm*—Rossi, Kimms & McDowell LLP

(57) ABSTRACT

In an MFP having a displaying unit smaller than that of a PC, it is very difficult to select an editing target from a plurality of objects. To accomplish this, an image containing a plurality of objects is displayed. Objects corresponding to a position designated on the displayed image are extracted (S3). Individual images corresponding to the extracted objects are laid out and displayed (S6). One of the individual images which are laid out and displayed is selected (S7). Image processing is executed for the selected object.

8 Claims, 28 Drawing Sheets

FINAL RENDERING IMAGE

FINAL RENDERING IMAGE

FIG. 15

C1 : DocumentSetStart
C2 : DocumentSize (A4)
C3 : DocumentDirection (PORT)  } 1501
C4 : DocumentType (Page)
C5 : DocumentSetEnd C6 : PageStart
C7 : Font {1}
C8 : FontSize {10}
C9 : FontColor {0,0,0}  } 1502
C10 : Position {10,5}
C11 : String {XXXX···YY···}

C12 : FillColor {128,64,35}
C13 : LineColor {255,92,128}
C14 : Position {40,300}
C15 : ArcRadius {10}
C16 : CloseArc {0,90}
C17 : FillColor {62,35,200}  } 1503
C18 : LineColor {10,40,80}
C19 : Position {40,300}
C20 : ArcRadius {10}
C21 : CloseArc {90,360}
C22 : PageEnd

FIG. 17

```
C1 : DocumentSetStart          ⎫
C2 : DocumentSize (A4)         ⎪
C3 : DocumentDirection (PORT)  ⎬ 1701
C4 : DocumentType (TILE)       ⎪
C5 : DocumentSetEnd            ⎭

C6 : PageStart

C7 : TileStart (0,0)           ⎫ 1703
C8 : TileEnd                   ⎭

C9  : TileStart (0,1)          ⎫
C10 : Font {1}                 ⎪
C11 : FontSize {10}            ⎪
C12 : FontColor {0,0,0}        ⎬ 1704
C13 : Position {0,5}           ⎪
C14 : String {XXXX}            ⎪
C15 : TileEnd                  ⎭
  .
  .
C100 : TileStart (2,4)         ⎫
C101 : FillColor {128,64,35}   ⎪
C102 : LineColor {255,92,128}  ⎪
C103 : Position {10,10}        ⎬ 1705
C104 : ArcRadius {10}          ⎪
C105 : CloseArc {0.90}         ⎪
C106 : TileEnd                 ⎭
  .
  .
C120 : TileStart (1,5)         ⎫
C121 : Font {1}                ⎪
C122 : FontSize {10}           ⎪
C123 : FontColor {0,0,0}       ⎬ 1707
C124 : Position {10,10}        ⎪
C125 : String {YY}             ⎭
C126 : FillColor {62,35,200}   ⎫
C127 : LineColor {10,40,80}    ⎪
C128 : Position {5,5}          ⎬ 1708
C129 : ArcRadius {10}          ⎪
C130 : CloseArc {180,270}      ⎪
C131 : TileEnd                 ⎭
  .
  .
C500 : PageEnd
```

1702 encompasses 1703–1706; 1706 encompasses 1707 and 1708.

F I G. 26
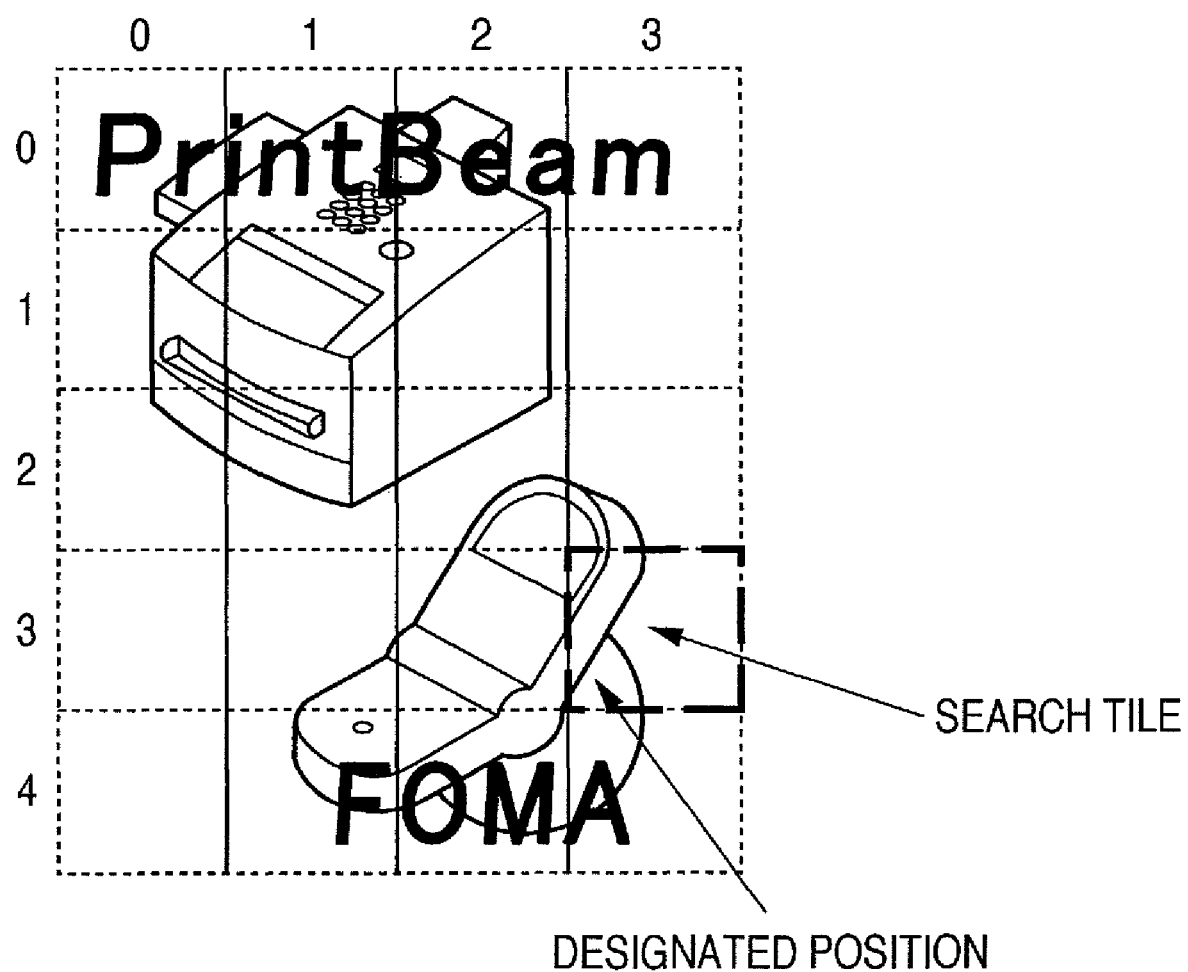

F I G. 28
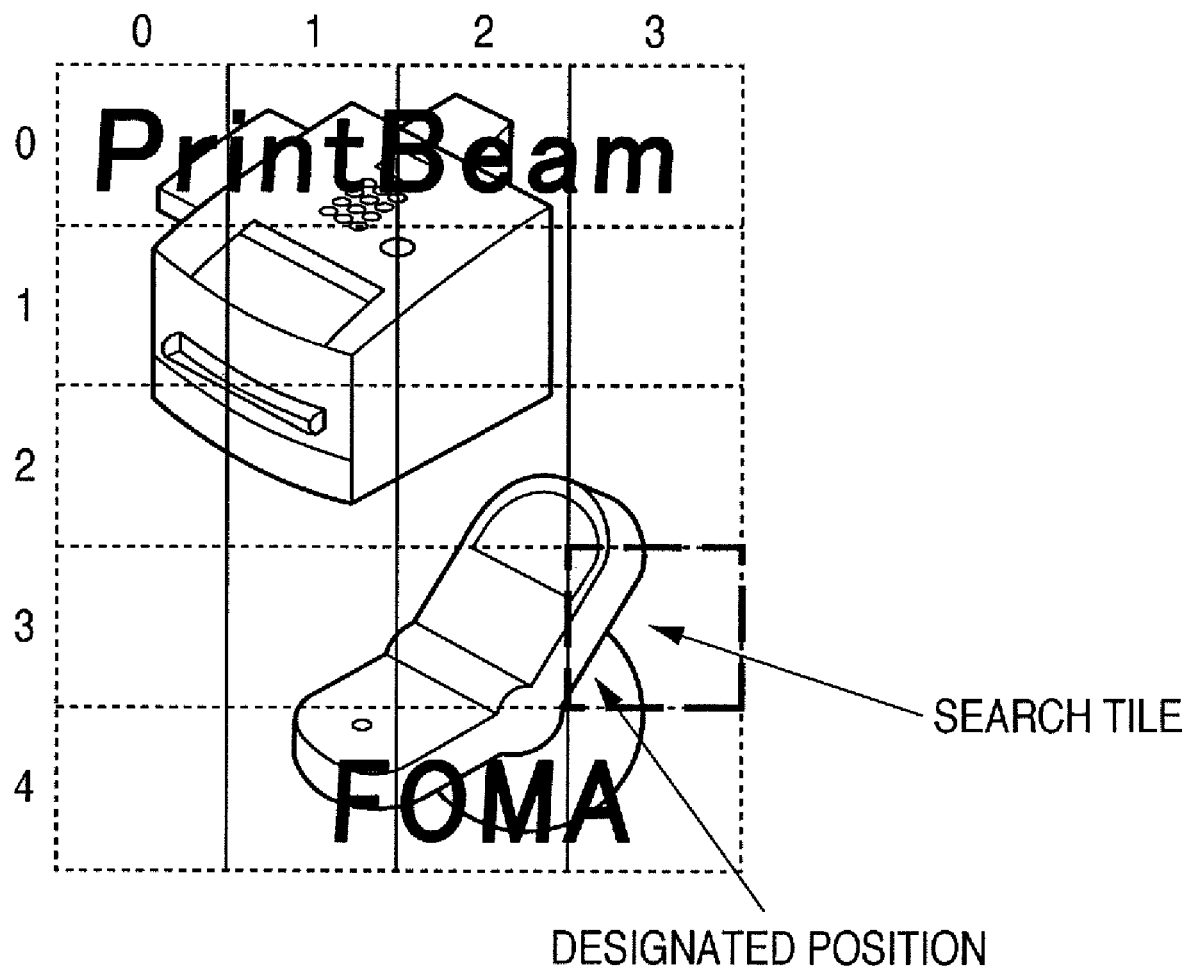

IMAGE PROCESSING APPARATUS AND CONTROL METHOD THEREOF

BACKGROUND OF THE INVENTION

1. Field of the Invention

The present invention relates to an image processing apparatus which rasterizes object data into image data and a control method thereof.

2. Description of the Related Art

Along with the progress of paperless offices, a demand for seamlessly handling printed products using, e.g., paper and electronic data also arises. For this purpose, even an MFP (Multi-Function Peripheral) serving as an I/F device between paper and electronic data is required to have a function of converting (to be referred to as "vectorizing" hereinafter) raster image data into objects such as graphic, text, and line images and reusing it (e.g., Japanese Patent Laid-Open No. 2005-157449).

More specifically, an MFP reads image data from an input device such as a scanner, spools it as a raster image, and vectorizes it. The vectorization is done in a PC connected to the MFP or on an installed application of the MFP system.

If a user can designate or convert an object using a preview function implemented in a conventional MFP, the reusability of a vector image can further be improved.

However, in designating a specific object on the preview window, another object may be too close to the target object, or the object size may be too small. In this case, it may be difficult to properly designate the desired object, resulting in cumbersome user operation.

For example, assume that original image data contains a plurality of objects. In this case, it is very difficult to select an editing target from the plurality of objects.

SUMMARY OF THE INVENTION

The present invention enables realization of an image processing apparatus capable of easily selecting and editing a desired one of a plurality of objects contained in an image, and a control method thereof.

According to one aspect of the present invention, an image processing apparatus which forms an image by rendering an image containing a plurality of objects, the image processing apparatus comprises a displaying unit adapted to display the image containing the plurality of objects, an extracting unit adapted to extract objects corresponding to a position designated on the image displayed on the displaying unit, an extraction image displaying unit adapted to lay out and display individual images corresponding to the objects extracted by the extracting unit, and a selecting unit adapted to select one of the individual images which are laid out and displayed.

According to another aspect of the present invention, a control method of an image processing apparatus which forms an image by rendering an image containing a plurality of objects, the control method comprises the steps of displaying the image containing the plurality of objects, extracting objects corresponding to a position designated on the image displayed in the displaying step, laying out and displaying individual images corresponding to the objects extracted in the extracting step, and selecting one of the individual images which are laid out and displayed.

Further features of the present invention will become apparent from the following description of exemplary embodiments with reference to the attached drawings.

BRIEF DESCRIPTION OF THE DRAWINGS

FIG. 15 is a view showing a description example of a page vector (PDL command) that instructs printer output of the document shown in FIG. 14;

FIG. 17 is a view showing an example wherein data segmented into tiles as shown in FIG. 16 are described by tile vectors;

FIG. 26 is a view showing an example wherein only one tile is selected in enlarged display;

FIG. 28 is a view showing a state wherein when the user designates a position on the screen by using the coordinate pointing pen, only one tile is selected in the third embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
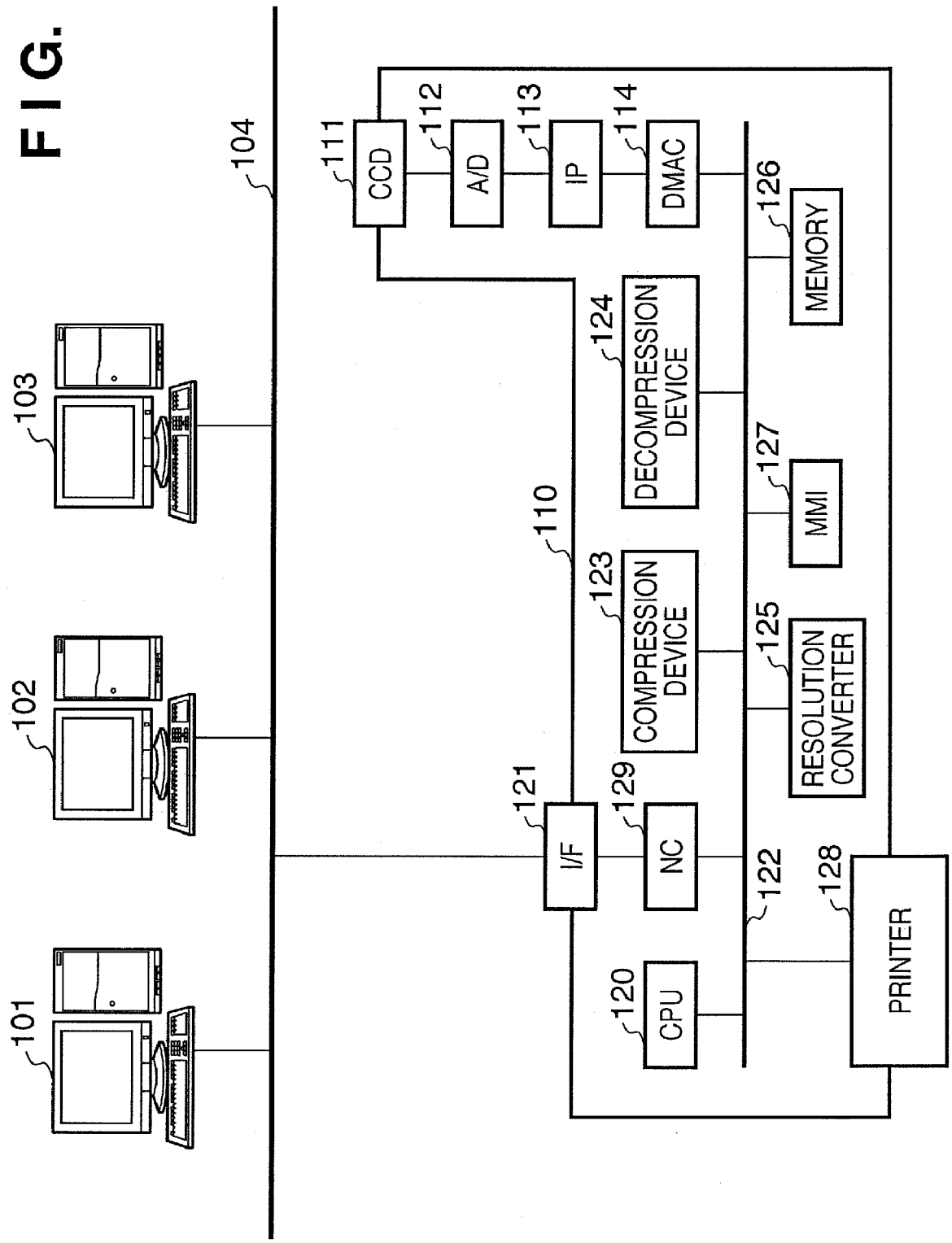
FIG. 1 is a block diagram showing an arrangement of a digital copying machine (MFP) according to the first embodiment of the present invention and a system configuration including the copying machine.

FIG. 1 is a block diagram showing an arrangement of a digital copying machine (MFP) according to the first embodiment of the present invention and a system configuration including the copying machine.

Personal computers (PCs) 101, 102, and 103 connect to a network 104. These are general personal computers used in, e.g., an office. Reference numeral 110 denotes a digital copying machine (MFP). In addition to a copy function, the digital copying machine (MFP) 110 has a printer function of receiving print data from a PC and printing it, a scanner function of reading a document image and supplying it to a PC, and a facsimile function.

The arrangement of the MFP 110 will be described below in detail.

A CCD 111 reads a document and generates an analog electrical signal. An A/D converter 112 converts the analog electrical signal generated by the CCD 111 into a digital electrical signal. An IP function 113 executes digital image processing such as masking and trimming for the digital electrical signal. A DMAC (Direct Memory Access Controller) 114 transfers the digital image data to a memory 126 of the digital copying machine by DMA. A CPU 120 controls the operation of the MFP 110 in accordance with a control program stored in the memory 126. An external interface 121 connects a digital camera or PC via the network 104. A control bus 122 is the control bus of the MFP 110. A compression device 123 has the same compression function as that of a digital camera. A decompression device 124 decompresses compressed image data. A resolution converter 125 scales image data at a predetermined scaling factor. The memory 126 includes a hard disk or SDRAM and stores digital image data. An MMI 127 is an operation unit serving as a user interface having a ten-key pad and a liquid crystal display panel on the MFP 110. The operation unit 127 employs a touch panel display screen which is directly operated by the user. A printer 128 prints an image based on image data. The external interface 121 serves as a network interface such as 10Base-T or 100Base-T that controls connection to the network 104. A network controller (NC) 129 receives print data sent from the PCs 101, 102, and 103 via the external interface 121 and stores the data in the memory 126.

The first embodiment will be described next in detail with reference to FIGS. 2 to 8.

Figure 2:
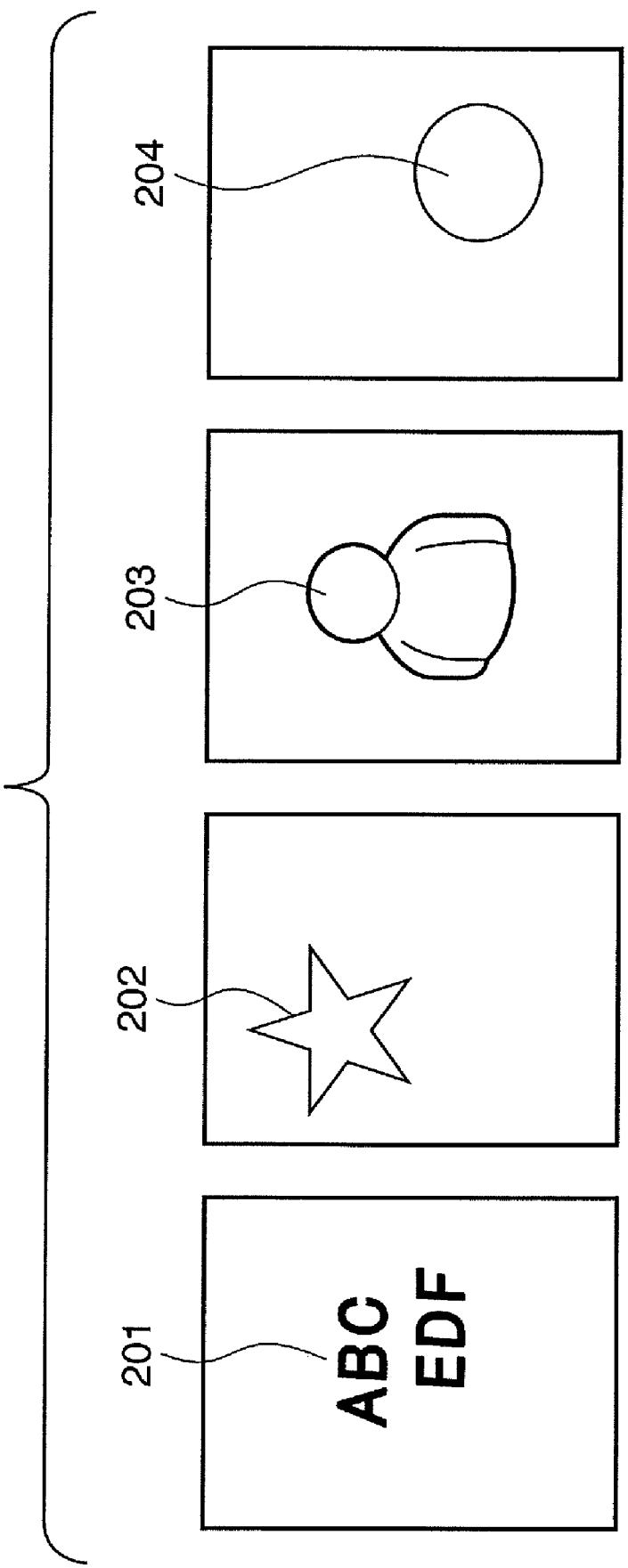
FIG. 2 is a view for explaining a plurality of objects created by application software that runs on a PC connected to a network to create document data and image data in the first embodiment.

FIG. 2 is a view for explaining a plurality of objects created by application software that runs on a PC connected to the above-described network 104 to create document data and image data.

Reference numerals 201, 202, 203, and 204 denote objects (image data).

Figure 3:
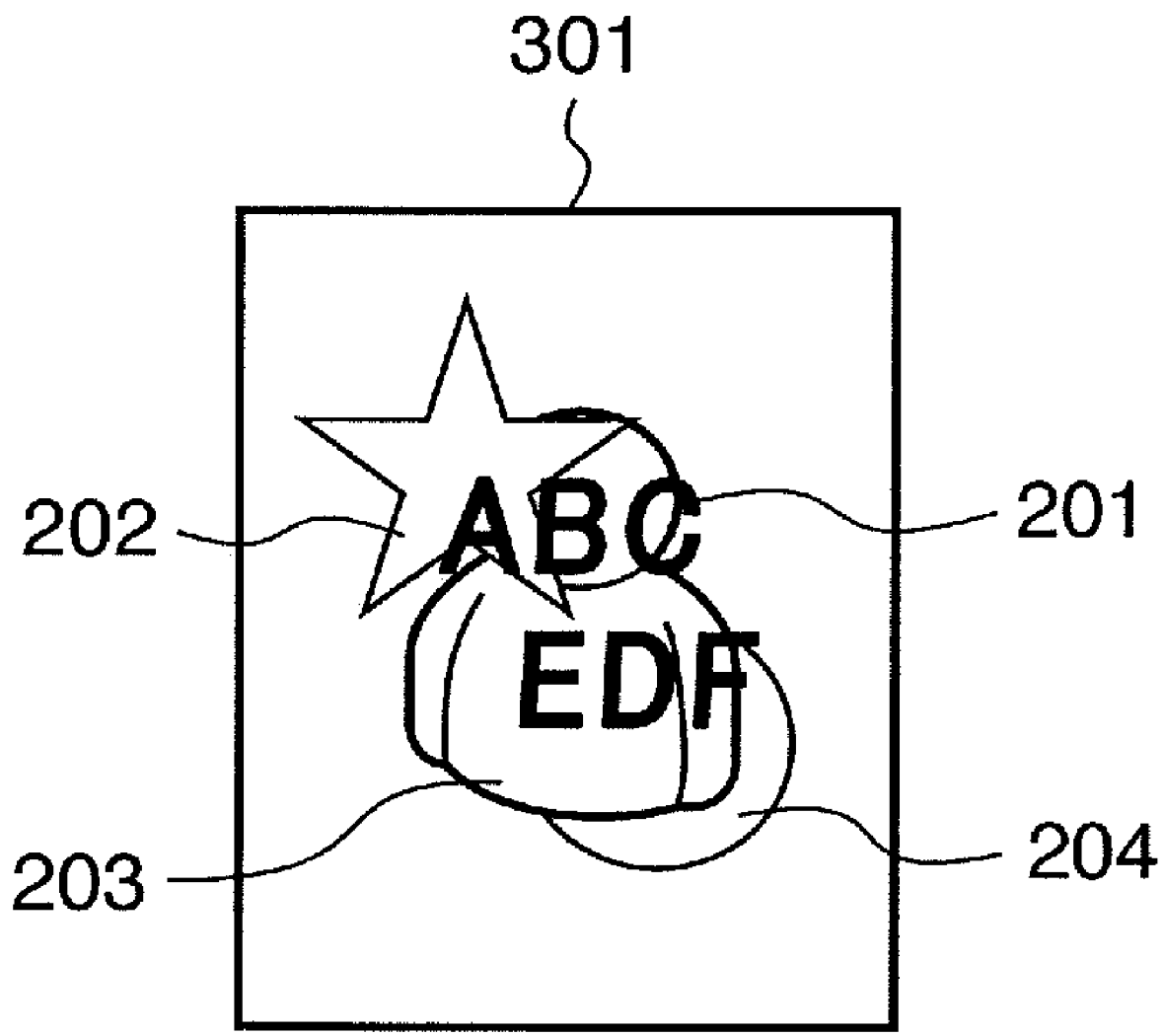
FIG. 3 is a view showing a display example of a composite image of the plurality of objects.

FIG. 3 is a view showing an example of a composite image of the objects 201, 202, 203, and 204.

Image data 301 containing the plurality of object data is transferred to the MFP 110 via the above-described network 104. The MFP 110 receives the image data and stores it in the bulk memory 126 such as a hard disk.

If a normal print instruction is input, the CPU 120 of the MFP 110 converts the stored object data into bitmap image data and causes the printer 128 to print it. However, if the user instructs via the operation unit 127 of the MFP 110 to edit the image and then print it, the CPU 120 displays the image of the object data and a color conversion palette on the displaying unit of the operation unit 127, as shown in FIG. 4.

Figure 4:
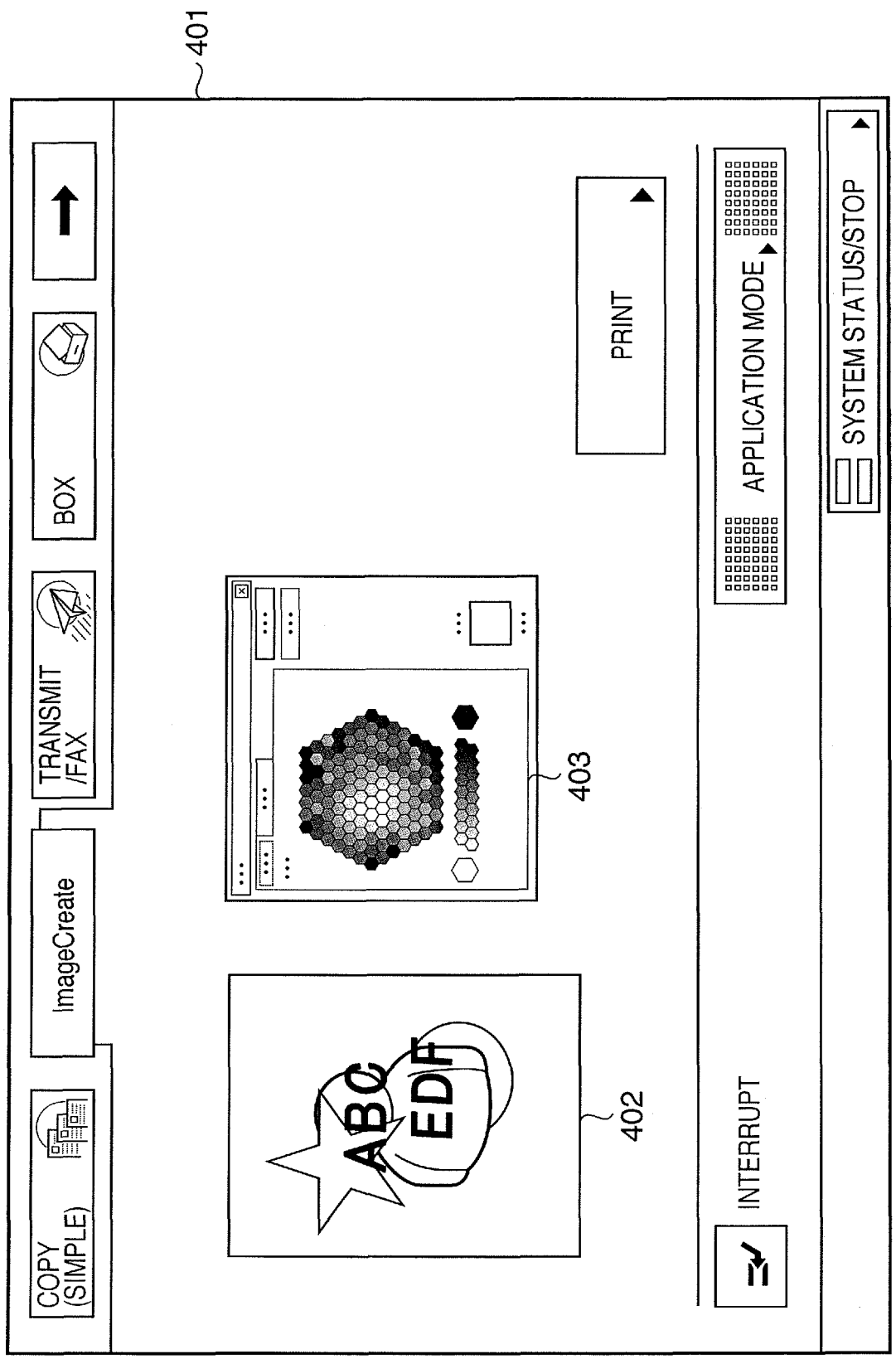
FIG. 4 is a view showing an example of a UI window displayed on the displaying unit of the operation unit of the MFP according to the first embodiment.

FIG. 4 is a view showing an example of a UI window displayed on a displaying unit 401 of the operation unit 127 of the MFP 110 according to the first embodiment.

An image 402 is displayed on the basis of the object data in FIG. 3. A color conversion palette 403 is used to instruct color conversion of the image 402.

The user selects one of the objects 201 to 204 contained in the image by pressing an area of the displayed image by, e.g., a finger. For the selected object, the user instructs color conversion by the color conversion palette. If the area of the object is small relative to a finger, it is difficult for the user to accurately designate the desired object by a finger. For example, the user who wants to select "ABCDEF" of the object 201 may select the human object 203.

Figure 5:
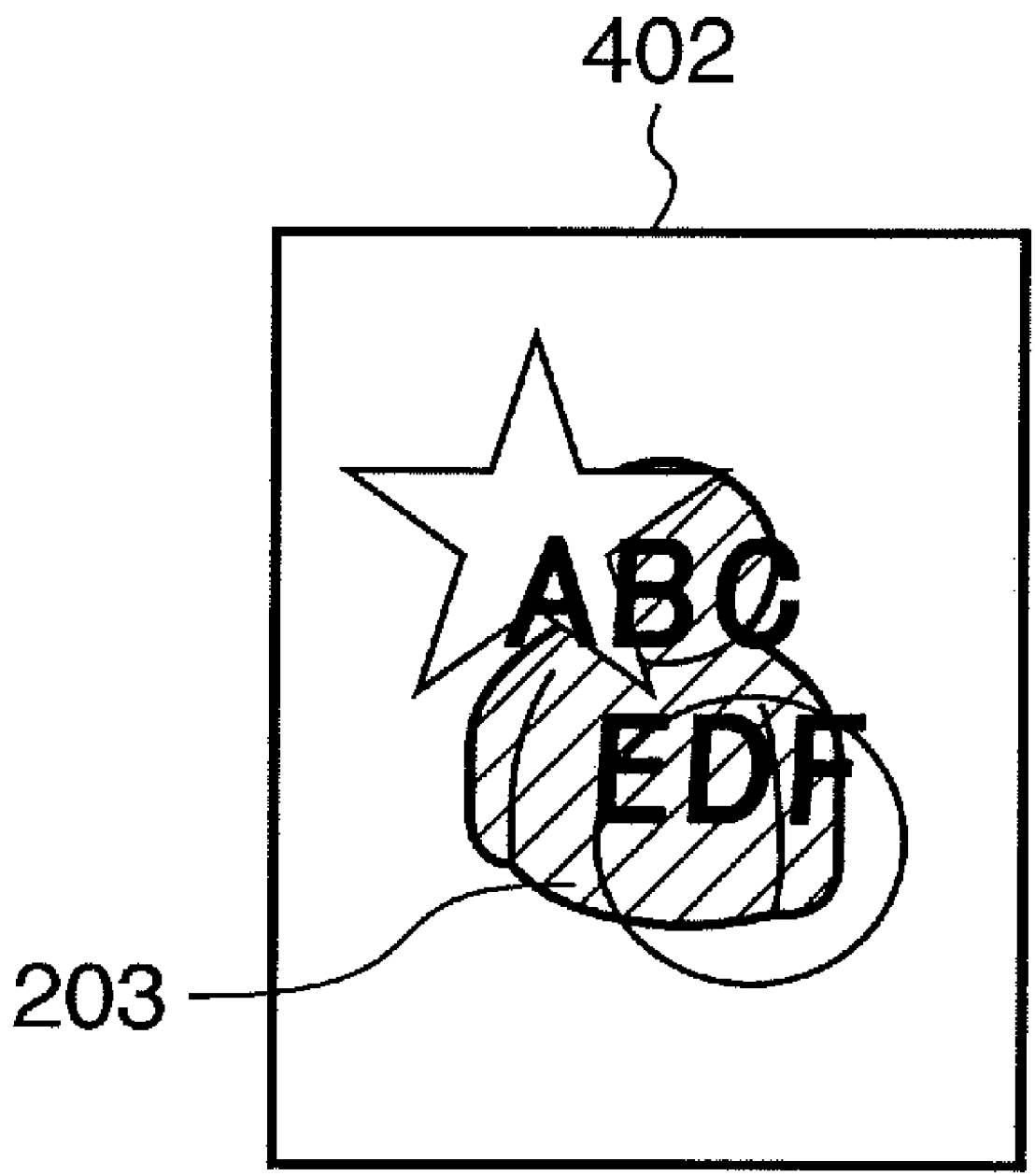
FIG. 5 is a view showing a state wherein a human object in the image is selected in the first embodiment.

FIG. 5 is a view showing a state wherein the human object 203 in the image 402 is selected.

In the first embodiment, when the user designates an area of an image by using the operation unit 127 of the MFP 110, all objects that exist in the designated area are selected.

Figure 6:
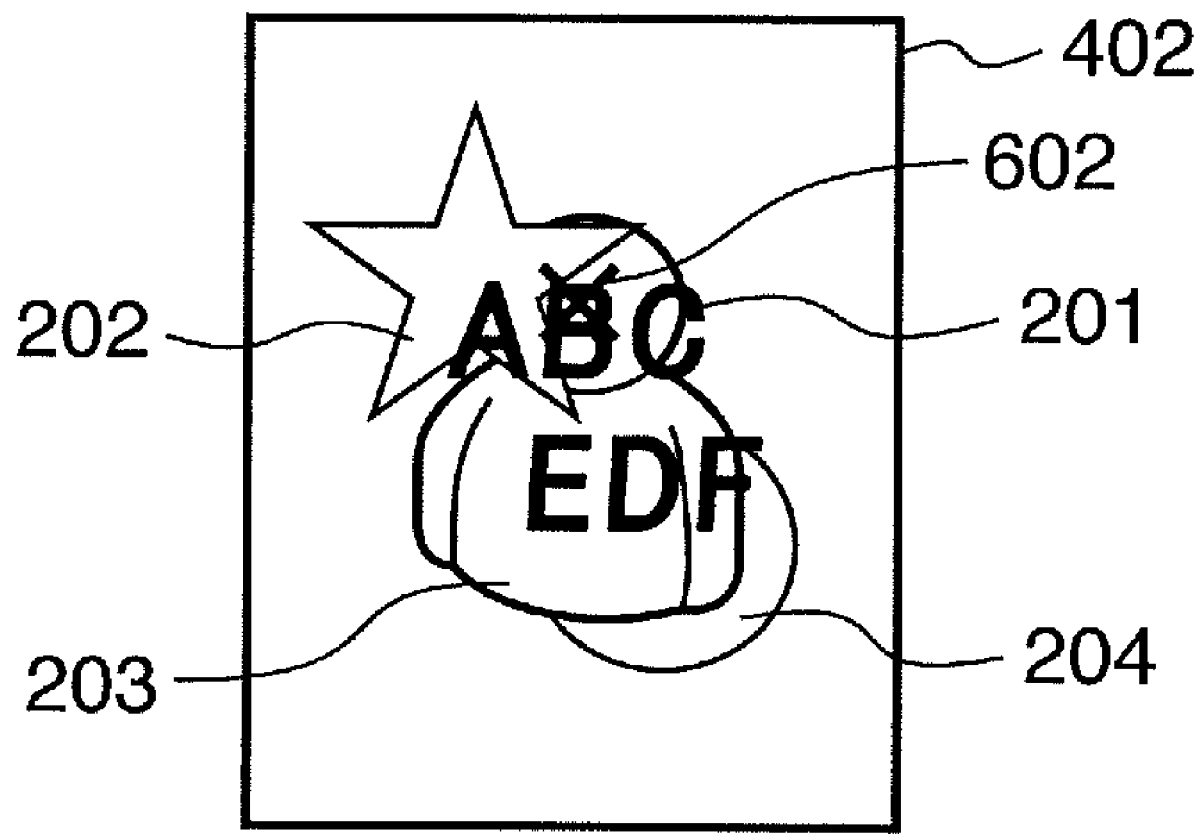
FIG. 6 is a view showing a state wherein a position in an image is designated in the first embodiment.

FIG. 6 is a view showing a state wherein a position 602 in the image 402 is designated.

In this case, the objects 201, 202, and 203 located at the designated position 602 are selected. The selected objects 201, 202, and 203 are individually rasterized on the memory 126 of the MFP 110. The objects are laid out and displayed on the displaying unit 401 of the operation unit 127.

Figure 7:
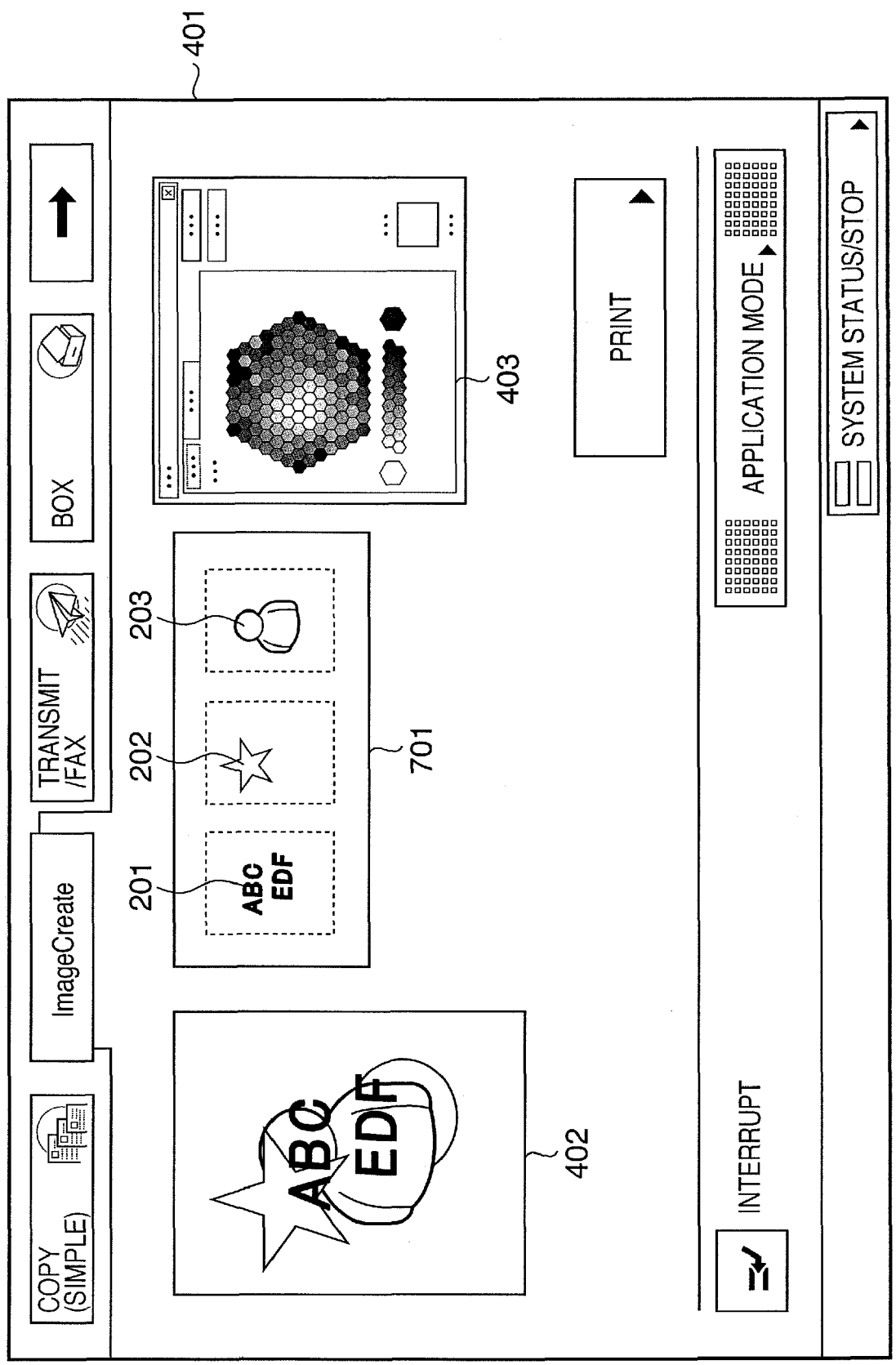
FIG. 7 is a view showing a display example on the displaying unit of the operation unit according to the first embodiment.

FIG. 7 is a view showing objects thus displayed on the displaying unit 401 of the operation unit 127. The same reference numerals as in FIG. 4 described above denote the same parts in FIG. 7.

The user selects an editing target from the objects 201 to 203 displayed on the displaying unit 401 of the operation unit 127. Desired image processing is executed for the selected object using an image editing function prepared in the MFP 110.

When the image processing finishes, the MFP merges the object (object 204) that is not edited by the user and the objects (objects 201 to 203) selected and processed by the user. The MFP renders the merged object to generate final image data. The printer 128 prints an image based on the generated image data.

Figure 8:
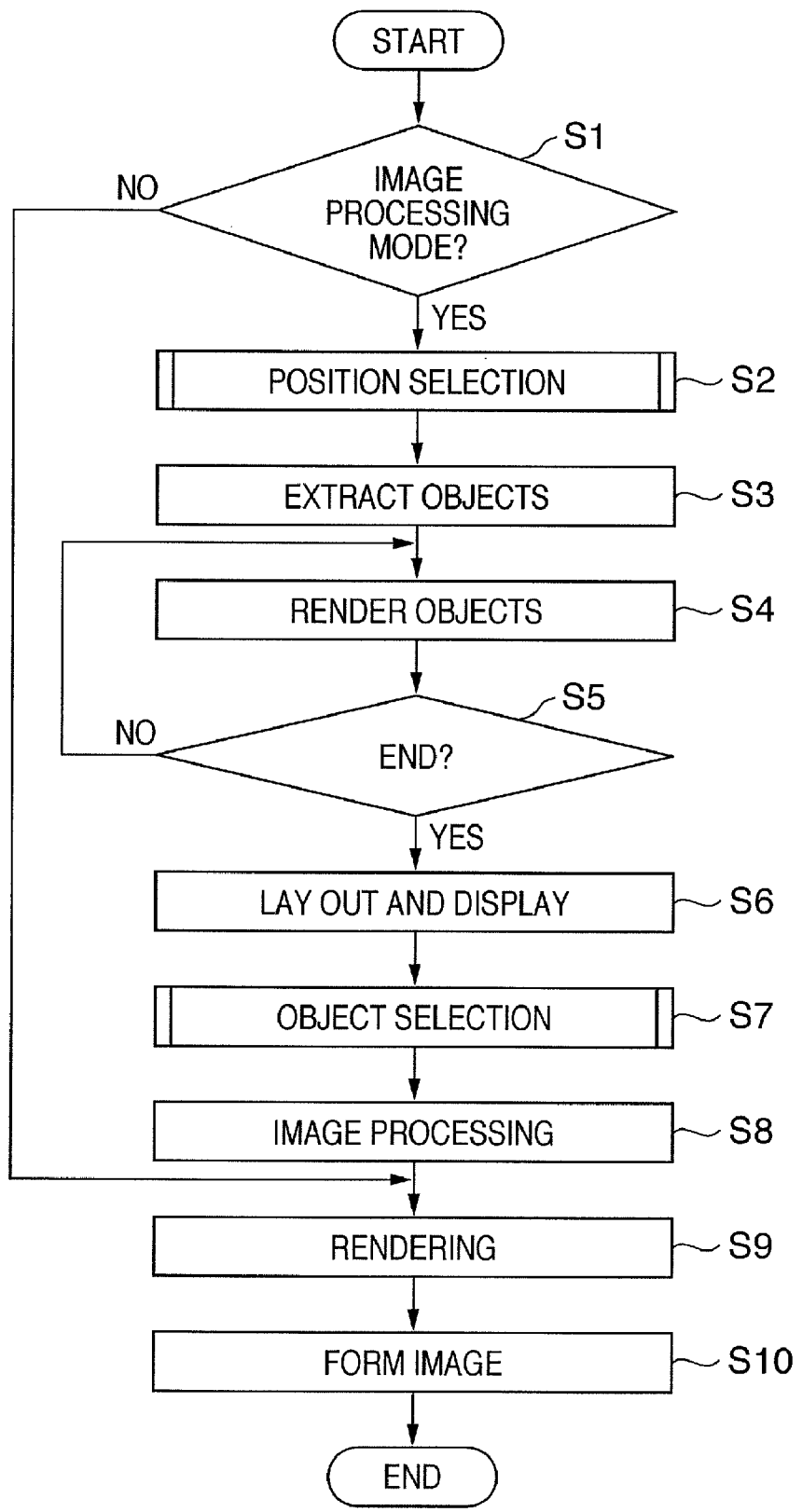
FIG. 8 is a flowchart for explaining a process in the MFP according to the first embodiment.

FIG. 8 is a flowchart for explaining a process in the MFP 110 according to the first embodiment. The program to execute the process is stored in the memory 126 at the time of execution and executed under the control of the CPU 120.

In step S1, the CPU 120 determines whether an image processing mode to be executed for, e.g., the above-described object image is designated. If NO in step S1, the process advances to step S9 to render the object. The object is printed in step S10.

If YES in step S1, the process advances to step S2 to wait for input of designation information to designate an object position to designate an object contained in the image. When, e.g., the position 602 in FIG. 6 described above is designated, the process advances to step S3. In step S3, the CPU 120 extracts all objects contained in the image at the designated position. In step S4, the CPU 120 renders each of the extracted objects. When rendering of all objects is ended, the process advances from step S5 to step S6. In step S6, the CPU 120 lays out and displays the selected objects, as indicated by 701 in FIG. 7.

In step S7, the CPU 120 waits for selection of one of the images that are laid out. When an image is selected, the process advances to step S8. In step S8, the CPU 120 executes image processing for the object corresponding to the selected image. In step S9, the CPU 120 renders the object that has undergone the image processing and rasterizes it into image data. In step S10, the CPU 120 causes the printer 128 to print an image based on the rasterized image data.

The MFP 110 according to the first embodiment stores image data containing a plurality of object data sent from a PC. If the user wants to edit the image on the MFP 110, the MFP 110 rasterizes the object into a bitmap image having a size displayable on the operation unit 127 and displays the image. To select an editing target object from the displayed image, the user designates a desired area in the displayed image by, e.g., a finger. The MFP 110 extracts all objects existing at the selected position, individually rasterizes the extracted objects into bitmap images, and individually lays out and displays the images. The user selects a desired object for editing again from the individually displayed objects. The process advances to the editing mode of the object. The image data of the edited object and the image data of the remaining objects are composited again. A composite image is printed on the basis of the composite image data.

As described above, according to the first embodiment, even if it is difficult to select one of a plurality of objects, the user can reliably designate a desired object and execute a process such as image processing for the designated object.

To make the user select a desired object on the touch panel, another method or a combination of several methods is also usable. As another method, for example, objects may be displayed separately. Alternatively, a specific object type is designated first, and then, an object is selected.

Second Embodiment

The second embodiment of the present invention will be described next. An MFP according to the second embodiment also has a copy function, printer function, scanner function, and facsimile function, like the MFP according to the above-described first embodiment.

Figure 9:
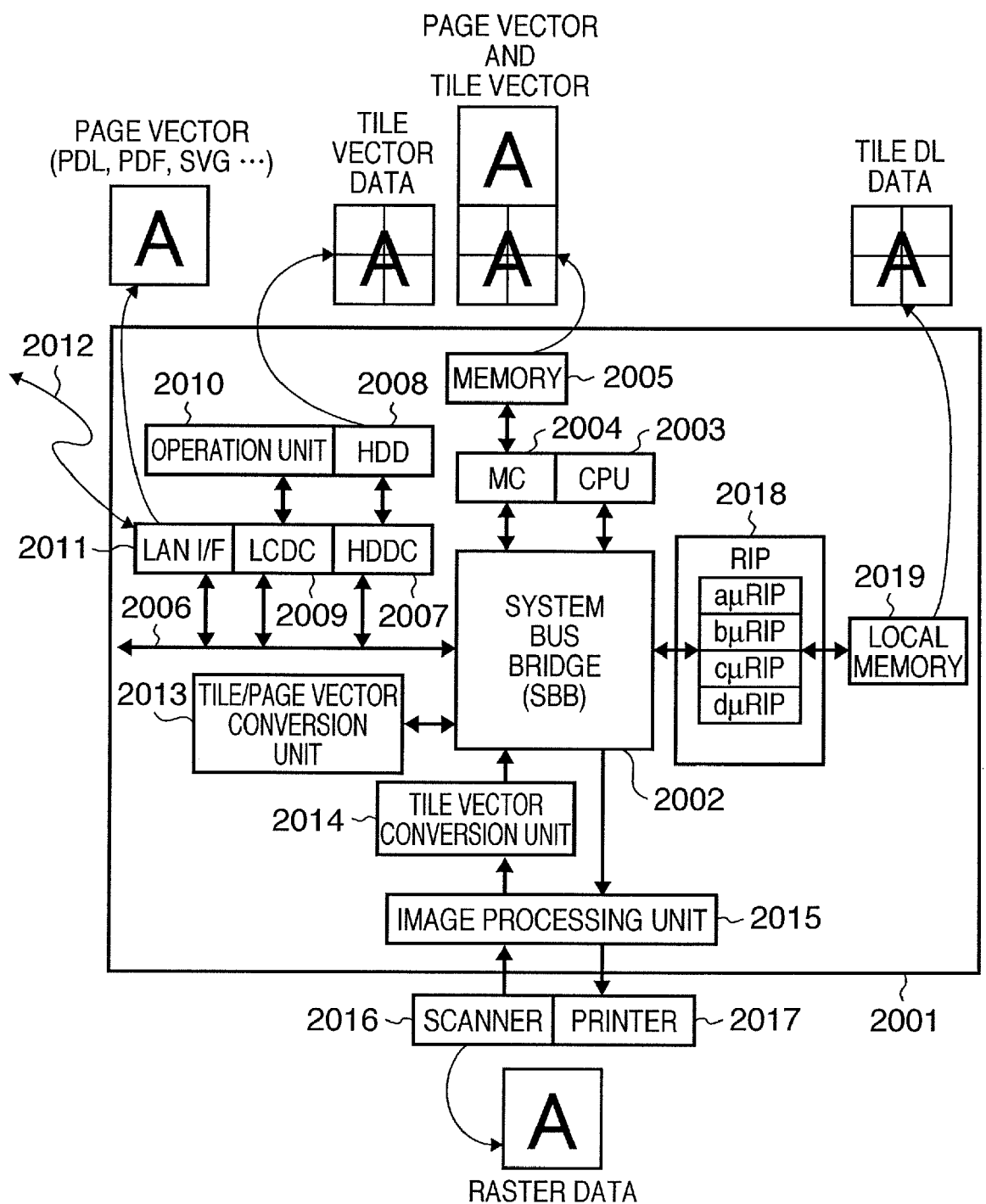
FIG. 9 is a functional block diagram for explaining a functional arrangement of an MFP according to the second embodiment of the present invention.

FIG. 9 is a functional block diagram for explaining a functional arrangement of an MFP according to the second embodiment of the present invention.

A controller 2001 controls the whole MFP. A system bus bridge (SBB) 2002 connects to a CPU 2003, memory controller (MC) 2004, general bus 2006, tile/page vector conversion unit 2013, tile vector conversion unit 2014, and tile vector rasterization unit (RIP) 2018. The RIP 2018 includes a plurality of rasterization units (μRIPs a to d). A memory (system memory) 2005 connects to the MC 2004. The memory 2005 serves as a medium to temporarily store image data and the program of the CPU 2003.

A hard disk controller (HDDC) 2007, operation unit controller (LCDC) 2009, and LAN I/F 2011 connect to the general bus 2006. The HDDC 2007 controls read/write access to a hard disk (HD) 2008 to store image data and the like. The LCDC 2009 controls image output to an operation unit (including a displaying unit) 2010 and operation information input in the operation unit 2010. The LAN I/F 2011 transmits/receives data to/from an external device via a network 2012 connected to the MFP.

The tile/page vector conversion unit 2013 executes data conversion between tile data and vector data. More specifically, the tile/page vector conversion unit 2013 converts tile data into vector data. The tile/page vector conversion unit 2013 also converts vector data into tile data. The tile vector conversion unit 2014 converts raster data into vector data. An image processing unit 2015 connects to the tile vector conversion unit 2014. A scanner 2016 and a printer 2017 connect to the image processing unit 2015. A local memory 2019 connects to the RIP 2018 to store data output from the RIP 2018.

Image data handled by the controller 2001 according to the second embodiment interfaces with an external device as page vector data (e.g., PDL, PDF, or SVG) and with the scanner 2016 or printer 2017 as raster data. The CPU 2003 interprets vector data to a primitive object in printing using the printer 2017 and converts the object into intermediate data called DL (Display List).

In the controller 2001 according to the second embodiment, the local memory 2019 connected to the RIP 2018 stores DL data. The tile vector conversion unit 2014 converts image data read by the scanner 2016 into tile vector data. Hence, the memory 2005 stores two kinds of image data, i.e., page vector data and tile vector data. Since the memory 2005 need store neither raster data nor DL data with a large image size, the image data area the memory 2005 must ensure can be small.

DL data output from the RIP 2018 is stored as DL data segmented into tiles. The memory capacity necessary for storing DL data of each tile is much smaller than that necessary for conventional DL data of each page. It is therefore possible to implement the local memory 2019 on chip and suppress the delay in memory read. As a result, tile data rasterization can speed up. Additionally, since the HDD 2008 need only store tiled data as image data, the speed of access to the HDD 2008 is prevented from decreasing so that the data process can speed up. When image data is segmented into tiles, the cost of the RIP 2018 can also decrease.

If higher performance for processing is necessary, the performance of the whole RIP 2018 can be improved by implementing a plurality of processing units (μRIPs) in parallel in the RIP 2018. That is, since the performance of the entire controller for processing is adjustable, a system capable of easily ensuring scalability can be built.

Image data process flows in various operation modes of the MFP according to the second embodiment will be explained below.

[Copy Mode]

Figure 10:
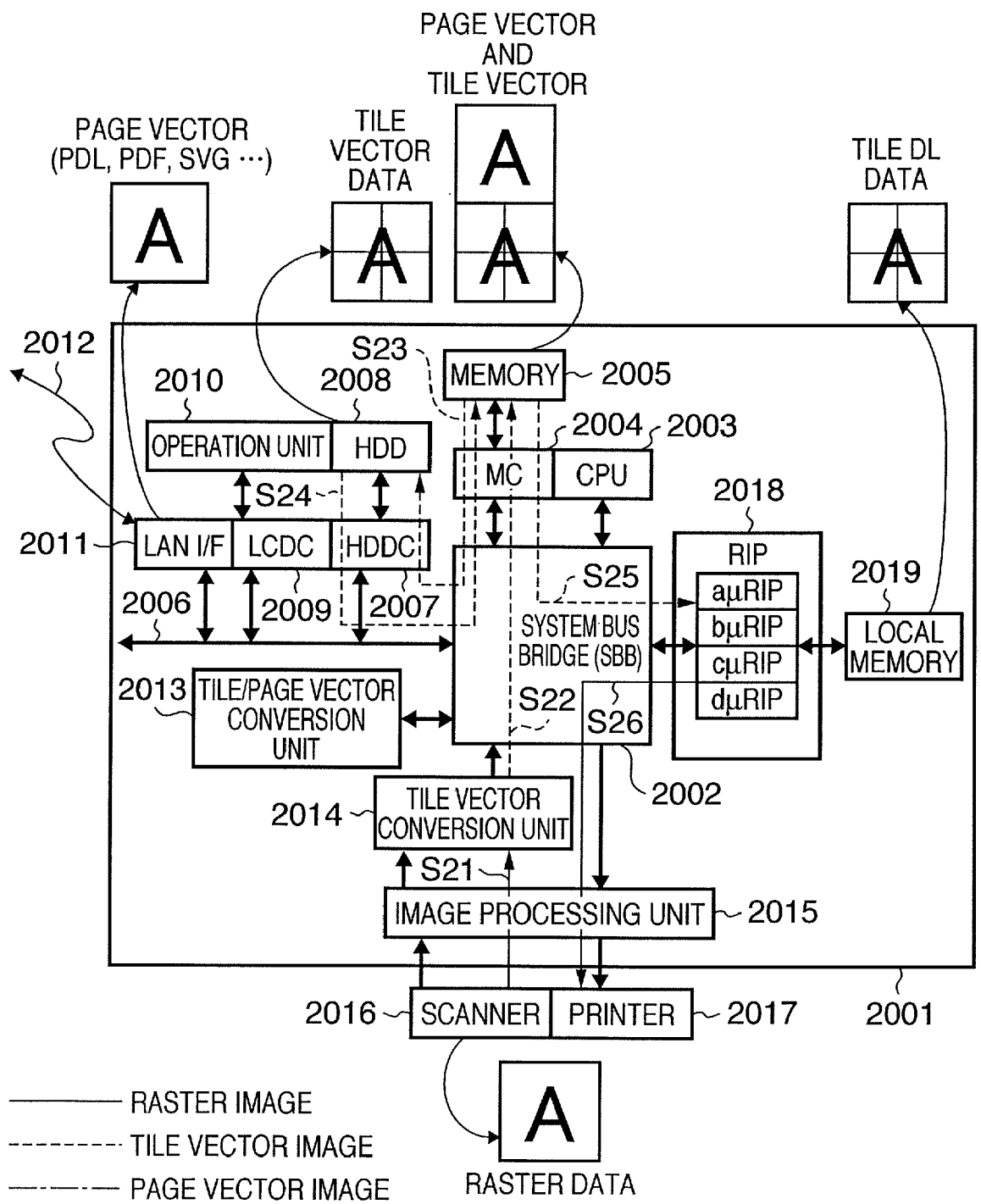
FIG. 10 is a view for explaining the flow of image data in the MFP according to the second embodiment which operates in a copy mode.

FIG. 10 is a view for explaining the flow of image data in the MFP according to the second embodiment which operates in a copy mode. The same reference numerals as in FIG. 9 described above denote the same parts in FIG. 10. Arrows in FIG. 10 indicate the flows of data. A solid arrow indicates the flow of raster image data. A broken arrow indicates the flow of tile vector image data. An alternate long and short dashed arrow indicates the flow of vector image data that describes a whole page. Page vector and tile vector image data will be described later in detail in association with the tile/page vector conversion unit 2013.

When the user instructs the start of copy operation from the operation unit 2010, the scanner 2016 starts a document image reading operation. The scanner 2016 inputs image data (R, G, and B) to the image processing unit 2015. After converting the image data processing frequency to the clock frequency of an image processing block, the follow process is executed.

(A) Correction of scanner properties such as the line pitch and chromatic aberration of the CCD sensor (B) Input image data quality correction such as color space correction and sharpness correction (C) Image manipulation such as frame removal and book frame removal of input image data When image processing by the image processing unit 2015 finishes, the image processing unit 2015 inputs the image data to the tile vector conversion unit 2014 (S21).

The tile vector conversion unit 2014 executes a tile vector conversion process. More specifically, the tile vector conversion unit 2014 segments the image data into blocks each having a predetermined size and vectorizes raster image data in each block, thereby generating vector image data of each block. The SBB 2002 executes bus arbitration so that the generated vector image data acquires a bus right to the memory 2005. The memory 2005 stores the vector image data via the MC 2004 (S22). When a data bus connects via the SBB 2002, data fundamentally acquires a bus right through bus arbitration by the SBB 2002, though a description thereof will not be repeated below.

The tile vector image data thus stored in the memory 2005 is stored in the HDD 2008 via the MC 2004, SBB 2002, and HDDC 2007 (S23). Storing image data in the HDD 2008 makes it possible to sort a plurality of document pages and output them in a different order in copy or store a document in the MFP as archive data.

The tile vector image data stored in the HDD 2008 is read out in accordance with the timing of printer ready sent from the CPU (not shown) of the printer 2017 under the control of the HDDC 2007. The memory 2005 temporarily stores the image data via the SBB 2002 and MC 2004 (S24). If the readout image data is directly output from the HDD 2008 to the printer 2017, it is impossible to guarantee synchronous output to the printer 2017 because of a decrease in access speed of the HDD 2008 or congestion on the general bus 2006. To prevent this and guarantee real-time throughput, page data is spooled in the memory 2005 before synchronous data transfer to the printer 2017.

The MC 2004 reads out the tile vector image data from the memory 2005 in accordance with an activation signal sent from the printer 2017 to the controller 2001 and transfers the readout data to the RIP 2018 via the SBB 2002 (S25). The RIP 2018 analyzes the tile vector data and generates (interprets) a rendering object (tile DL data) of each tile. The local memory 2019 temporarily stores the generated tile DL data. The RIP 2018 reads out the tile DL data from the local memory 2019, rasterizes it into raster image data of each tile, and outputs the raster image to the printer 2017 (S26).

In the second embodiment, the RIP 2018 includes the four processing units μRIPs a to d, as described above. The controller 2001 executes high-speed tile vector data rasterization by parallelly operating the μRIPs a to d. The vector data rasterization time dominates over the system performance. The performance can be improved by increasing the number of μRIPs. Hence, the configuration of the second embodiment allows to easily build a scalable system.

The RIP 2018 transfers the image data rasterized in each tile to the image processing unit 2015. The image processing unit 2015 executes the following processes.

(A) Conversion from tile raster image data to page raster image data (B) Correction of the colors and density of image data in accordance with the printer characteristics (C) Halftoning by quantization and tone conversion of image data (D) Frequency conversion to output image data in synchronism with a printer interface clock The image processing unit 2015 executes these image processes and transfers the processed raster image data to the printer 2017. The printer 2017 prints the image on a printing medium (printing paper sheet).

[Print Mode]

Figure 11:
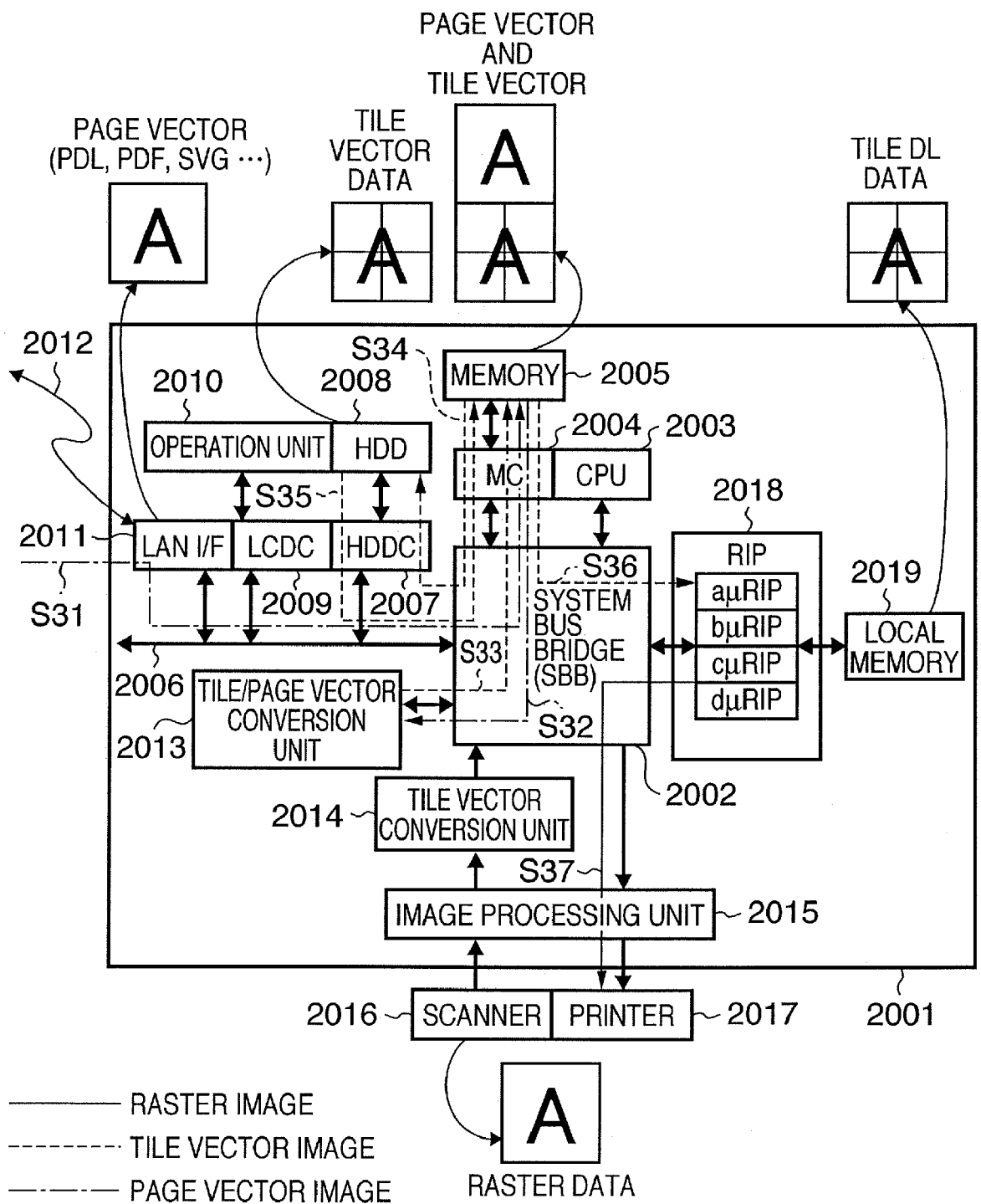
FIG. 11 is a view for explaining the flow of image data in the MFP according to the second embodiment which operates in a print mode.

FIG. 11 is a view for explaining the flow of image data in the MFP according to the second embodiment which operates in a print mode. The same reference numerals as in the above-described drawings denote the same parts in FIG. 11. Arrows in FIG. 11 indicate the flows of data. A solid arrow indicates the flow of raster image data. A broken arrow indicates the flow of tile vector image data. An alternate long and short dashed arrow indicates the flow of vector image data that describes a whole page.

The LAN I/F 2011 connected to the general bus 2006 receives page vector image data from an external device (e.g., PC) connected to the network 2012. The LAN I/F 2011 transfers the image data to the memory 2005 via the MC 2004 connected to the SBB 2002 (S31). The tile/page vector conversion unit 2013 reads out the page vector image data from the memory 2005 and executes a tile vector conversion process (S32). More specifically, the tile/page vector conversion unit 2013 segments each object existing in the page vector data into objects each fitted in a block (tile) with a predetermined size, thereby generating vector image data of each tile. The memory 2005 stores the thus generated vector image data via the SBB 2002 again (S33).

The HDD 2008 stores the tile vector image data stored in the memory 2005 via the MC 2004, SBB 2002, and HDDC 2007 (S34). Storing image data in the HDD 2008 makes it possible to sort a plurality of document pages and output them in a different order in copy or store a document in the MFP as archive data. The tile vector image data stored in the HDD 2008 is read out in accordance with the timing of printer ready sent from the CPU (not shown) of the printer 2017 under the control of the HDDC 2007. The memory 2005 temporarily stores the image data via the SBB 2002 and MC 2004 (S35).

The MC 2004 reads out the tile vector image data from the memory 2005 in accordance with an activation signal sent from the printer 2017 to the controller 2001 and transfers the readout data to the RIP 2018 via the SBB 2002 (S36). The RIP 2018 analyzes the tile vector data and generates (interprets) a rendering object (tile DL data) of each tile. The local memory 2019 temporarily stores the generated tile DL data.

The RIP 2018 reads out the tile DL data from the local memory 2019, rasterizes it into raster image data of each tile, and outputs the raster image. In the second embodiment, the RIP 2018 includes the four sub rasterization units μRIPs a to d. It is possible to implement high-speed tile vector data rasterization by parallelly operating the μRIPs a to d. The vector data rasterization time dominates over the system performance. The performance can be improved by increasing the number of μRIPs. Hence, the configuration of the second embodiment allows to easily build a scalable system.

The RIP 2018 transfers the image data rasterized in each tile to the image processing unit 2015 (S37). The image processing unit 2015 executes the following processes.

(A) Conversion from tile raster image data to page raster image data (B) Correction of the colors and density of image data in accordance with the printer characteristics (C) Halftoning by quantization and tone conversion of image data (D) Frequency conversion to output image data in synchronism with a printer interface clock The image processing unit 2015 executes these image processes and transfers the processed raster image data to the printer 2017. The printer 2017 prints the image on a printing medium.

[Transmission Mode]

Figure 12:
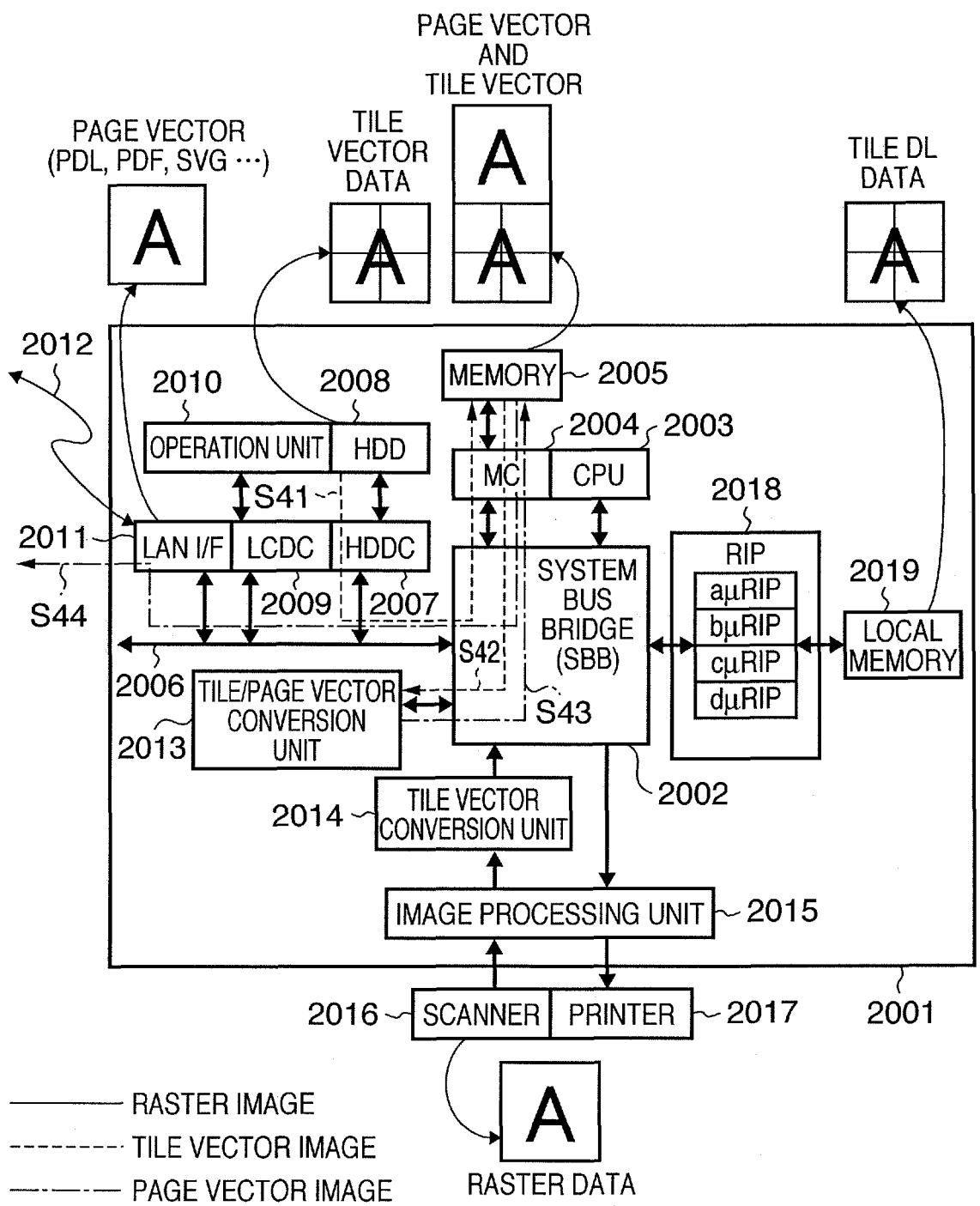
FIG. 12 is a view for explaining the flow of image data in the MFP according to the second embodiment which operates in a transmission mode.

FIG. 12 is a view for explaining the flow of image data in the MFP according to the second embodiment which operates in a transmission mode. The same reference numerals as in the above-described drawings denote the same parts in FIG. 12. Arrows in FIG. 12 indicate the flows of data. A solid arrow indicates the flow of raster image data. A broken arrow indicates the flow of tile vector image data. An alternate long and short dashed arrow indicates the flow of vector image data that describes a whole page. For scan image data, the data flow until the HDD 2008 stores the image data is the same as in [Copy] described above. For image data received from an external device on the network, the data flow until the HDD 2008 stores the image data is the same as in [Print] described above. A description thereof will not be repeated.

Tile vector image data stored in the HDD 2008 is read out by the HDDC 2007 connected to the general bus 2006 and temporarily stored in the memory 2005 via the SBB 2002 (S41). The tile/page vector conversion unit 2013 reads out the tile vector image data from the memory 2005 and executes a tile vector conversion process (S42). More specifically, the tile/page vector conversion unit 2013 concatenates the objects segmented into blocks, thereby generating page vector image data that describes the objects of a whole page. The memory 2005 stores the generated page vector image data again via the SBB 2002 (S43). The LAN I/F 2011 connected to the general bus 2006 reads out the page vector image data from the memory 2005 and transmits it to an external device (e.g., PC) connected to the network 2012 (S44).

As in the second embodiment, when tile vector image data to be transmitted to an external device returns to page vector image data to decrease the number of objects, the transmission data amount can be reduced. It is also possible to easily convert the data to a general format such as PDF or SVG.

[Explanation of Tile Vector Conversion Unit 2014]

The tile vector conversion unit 2014 in the controller 2001 will be described in detail.

Figure 13:
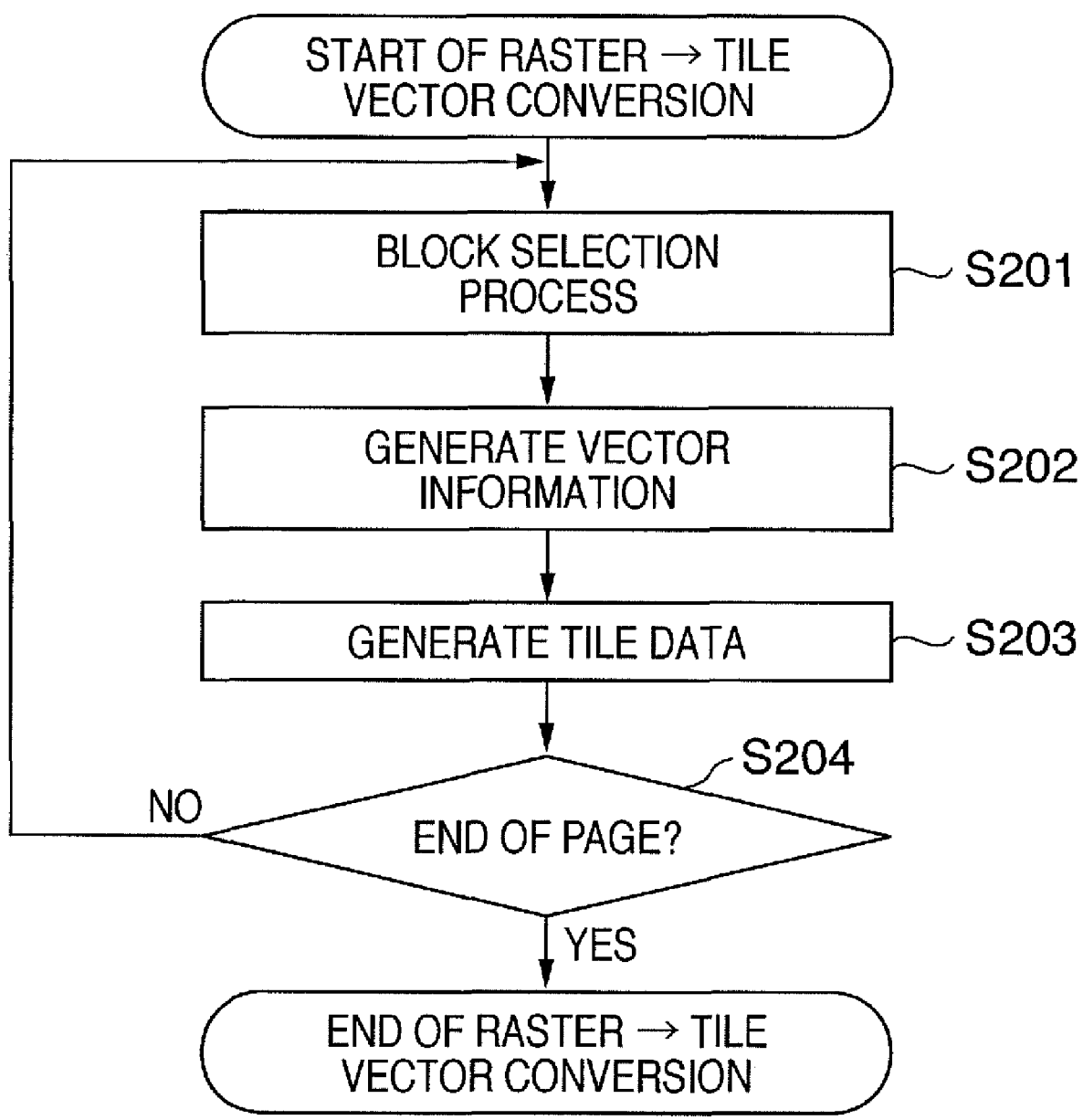
FIG. 13 is a flowchart for explaining a process in a raster tile conversion unit according to the second embodiment.

FIG. 13 is a flowchart for explaining a process in the tile vector conversion unit 2014 according to the second embodiment. A process of the tile vector conversion unit 2014, which is implemented by the CPU 2003 and a control program, will be described.

In step S201, the tile vector conversion unit 2014 segments raster image data received from the image processing unit 2015 into text and line regions containing a text or line, halftone photo regions, image regions with indefinite shapes, and other regions. The tile vector conversion unit 2014 further segments each text and line region into text regions mainly containing a text and line regions mainly containing, e.g., a table or graphic and then, each line region into table regions and graphic regions. In the second embodiment, connected pixels are detected. Image data is segmented into the regions of respective attributes on the basis of, e.g., the shape, size, and pixel density of each circumscribed rectangular region of connected pixels. A text region is segmented into rectangular blocks (text region rectangular blocks) of paragraphs. A line region is segmented into rectangular blocks of individual objects (table region rectangular blocks and line region rectangular blocks) such as tables and graphics. A photo region expressed by halftone is segmented into rectangular blocks of objects such as image region rectangular blocks and background region rectangular blocks. Each separated region is further segmented into regions (tiles) having a predetermined size. Each tile is vectorized in the next vectorization step.

In step S202, the tile vector conversion unit 2014 converts image data of each attribute region into vector data by a vectorization process. For example, vectorization methods (a) to (f) to be described below are usable.

(a) When an attribute region is a text region, the text image is converted into codes by OCR. Alternatively, the size, style, and font of each character are recognized, thereby converting the character into font data which is visually faithful to the character obtained by scanning the document.

(b) When an attribute region is a text region, and recognition by OCR is impossible, the outline of each character is traced, thereby converting the data into a format that expresses outline information (outline) as connected line segments.

(c) When an attribute region is a graphic region, the outline of the graphic object is traced, thereby converting the data into a format that expresses outline information as connected line segments.

(d) Outline information of the line segment format in the method (b) or (c) is fitted by, e.g., a Bezier function, thereby converting the data into function information.

(e) The shape of each graphic is recognized from the outline information of the graphic object in the method (c), thereby converting the data into graphic definition information such as a circle, rectangle, or polygon.

(f) When an attribute region is a graphic region containing an object of a table format in a specific region, rule lines and frame lines are recognized, thereby converting the data into form information with a predetermined format.

The process advances to step S203 to add header information to each data that is vector-converted into command definition format information such as format code information, graphic information, or function information in the methods (a) to (f). The controller 2001 adds header information to discriminate a vector type such as a page vector or tile vector or the coordinate position of a tile in a page. In step S204, it is checked whether the data is the final data of the page. If the data process of the page finishes, the conversion process is ended. If the data process does not finish yet, the process returns to step S201 to repeat the above-described process. Tile vector data packed to each tile in this way is output to the SBB 2002.

[Explanation of Tile/Page Vector Conversion Unit 2013]

The tile/page vector conversion unit 2013 in the controller 2001 will be described in detail.

Figure 14:
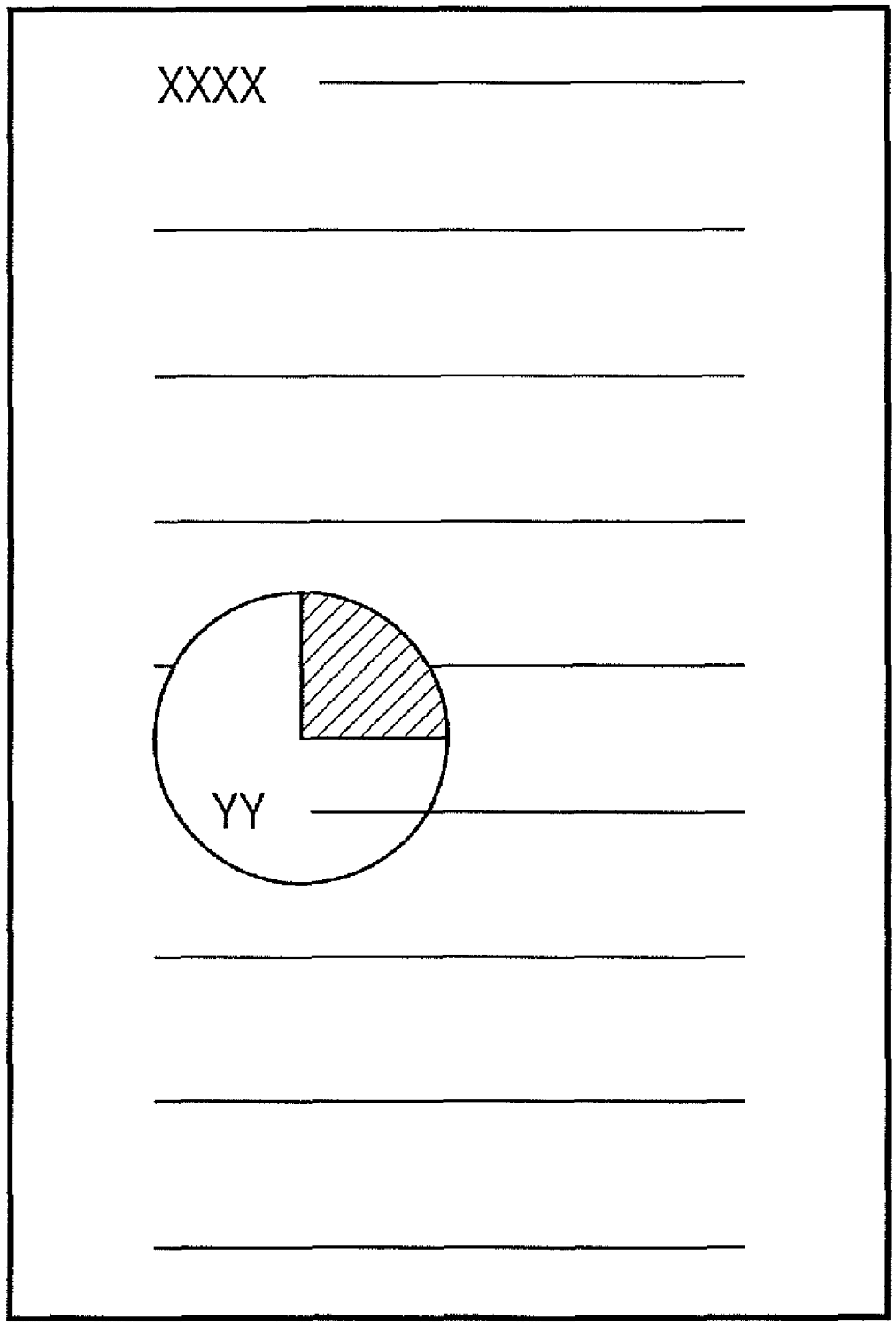
FIG. 14 is a view for explaining a document created by an application in an external device (e.g., PC) on a network.

FIG. 14 is a view for explaining a document created by an application in an external device (e.g., PC) on the network. For the descriptive convenience, the widthwise (lateral) direction of a document is defined as an X direction, and the longitudinal (vertical) direction as a Y direction.

FIG. 15 is a view showing a description example of a page vector (PDL command) that instructs printer output of the document shown in FIG. 14.

Referring to FIG. 15, reference numeral 1501 denotes a document setting command related to setting of the entire document; 1502, a text rendering command; and 1503, a graphic rendering command. Details of the rendering commands 1501 to 1503 will be described below.

C1 to C5 are commands related to the entire document. The commands C1 to C5 are added to only one part of a document. Examples of the commands related to the entire document are a character set command (font designation command), scalable font command (a command to designate whether to use a scalable font), and hard reset command (a command to reset the preceding printer use environment). C1 is a document set start command. C2 is a command indicating the output paper size of the document. In this case, A4 is set. C3 is a command indicating the direction of document. Document directions include "portrait" and "landscape". In this case, C3 indicates "portrait" (PORT). C4 is a command indicating the document type, i.e., page vector or tile vector. In this case, C4 indicates "page vector" (PAGE). C5 is a document set end command.

C6 to C22 are commands to output a document 801. C6 to C11 are related to the character rendering command. C6 indicates the start of the page. C7 is a command to select the font type of text. In this case, a font set numbered "1" is selected. C8 sets the font size, and "10 points" is selected. C9 sets the text color and sequentially indicates the luminances of R (red), G (green), and B (blue) color components. The luminances are designated by 256 levels from 0 to 255. C10 indicates the coordinates of the text rendering start position. A coordinate position is designated on the basis of the origin that is set at the upper left corner of the page. In this case, setting is done to start text rendering from a position (10,5). C11 indicates the character string (XXXX . . . ) to be actually rendered.

The rendering commands C12 to C22 of a graphic (a circle and a ¼ circle in FIG. 14) will be described next.

C12 indicates the filling color of a plane in graphic rendering. The color is designated in the same way as for the text color (C9). C13 designates the line color of graphic rendering. C14 indicates the coordinates of the graphic rendering position. C15 designates the radius of an arc to be rendered. In this case, "10" coordinate units are designated. C16 designates rendering of a closed arc with the radius designated by C15. The two parameters in the command indicate the rendering start angle and end angle in rendering an arc. Vertical information is defined as 0°. C16 here indicates rendering of an arc from 0° to 90° (¼ circle). C17 to C21 designate, e.g., the plane, line colors, and position of a graphic, like the commands C12 to C16. C22 indicates the end of the command.

Figure 16:
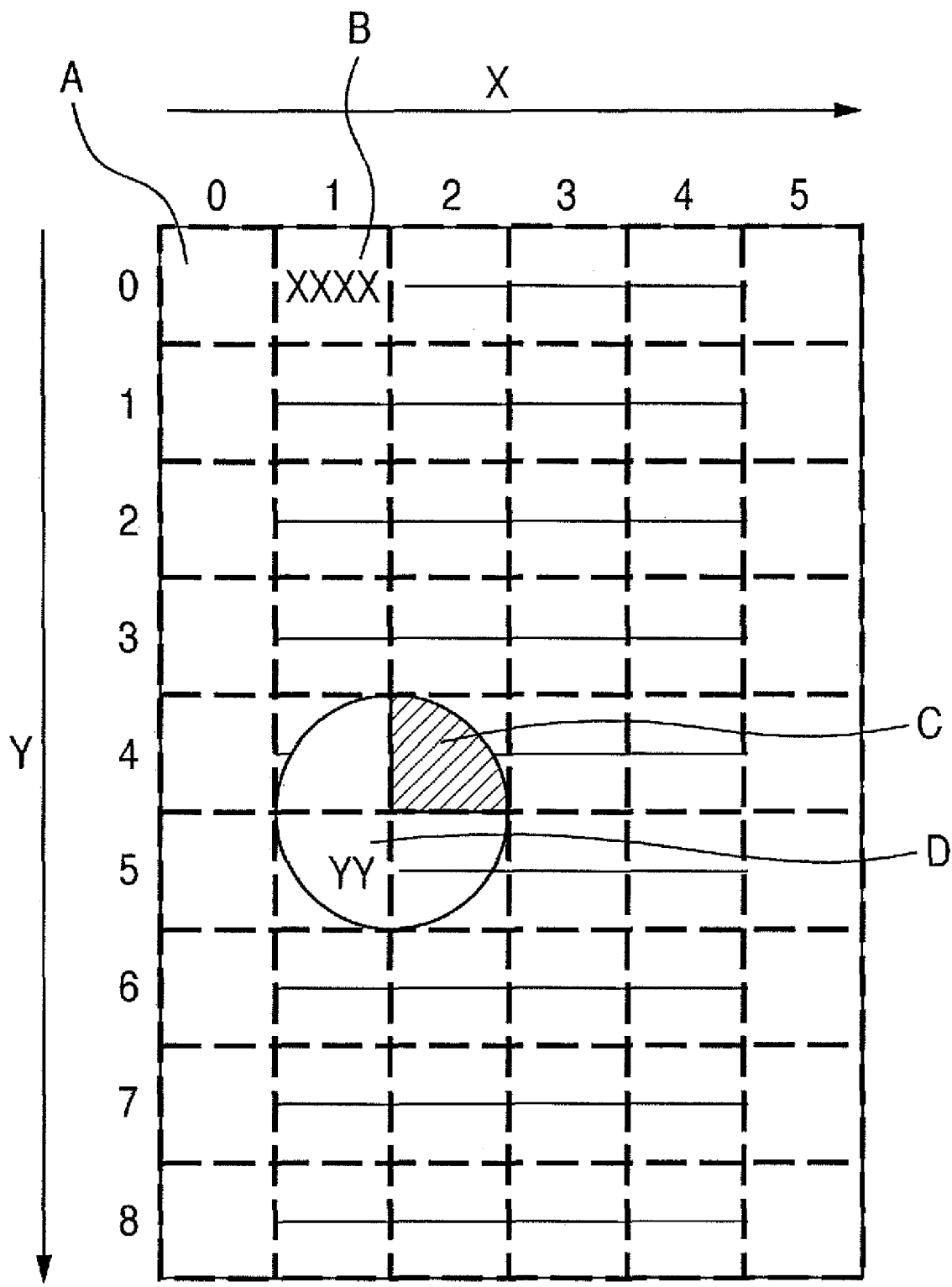
FIG. 16 is a view showing a state wherein the document shown in FIG. 14 is segmented into blocks (tiles)

FIG. 16 is a view showing a state wherein the document shown in FIG. 14 is segmented into blocks (tiles).

Two arrows in FIG. 16 indicate the widthwise direction X and longitudinal direction Y of the document. The numbers arrayed in the X direction in FIG. 16 indicate X-direction tile IDs. The numbers arrayed in the Y direction indicate Y-direction tile IDs. A to D represent tile vectors corresponding to tiles located at positions of tile IDs=(0,0), (1,0), (2,4), and (1,5).

FIG. 17 is a view showing an example wherein data segmented into tiles as shown in FIG. 16 are described by tile vectors.

Referring to FIG. 17, reference numeral 1701 denotes a document setting command related to setting of an entire document, which corresponds to the document setting command 1501 in FIG. 15. Reference numeral 1702 denotes a whole rendering command; 1703 to 1706, rendering command sequences of the tiles A, B, C, and D in FIG. 16; and 1707 and 1708, a text rendering command and a graphic rendering command of the tile D.

Details of the rendering command sequences 1701 to 1708 corresponding to the tiles will be described below.

C1 to C5 in the document setting command 1701 are the same as the above-described commands C1 to C5 in FIG. 15. In FIG. 17, however, the command C4 representing the document type indicates "tile vector" (TILE).

C6 to C15, C100 to C106, C120 to C131, and C500 are commands to output the document shown in FIG. 16. C6 is a command to indicate the start of the page. C7 indicates the start of the rendering command sequence 1703 of the tile A in FIG. 16. The two parameters (0,0) in the command indicate the ID of the tile in the document. C8 indicates the end of the rendering command of the tile A. For a tile including no object, like the tile A, only the start and end of the tile are described. C9 indicates the start of the rendering command sequence 1704 of the tile B in FIG. 16. C10 is a command to select the font type of the tile. In this case, a font set numbered "1" is selected. C11 sets the font size, and "10 points" is selected. C12 is a command to set the text color and sequentially indicates the luminances of R (red), G (green), and B (blue) color components. The luminances are designated by 256 levels from 0 to 255. C13 indicates the coordinates of the text rendering start position. C14 indicates the character string (XXXX . . . ) to be rendered in the tile B. The start position is designated by coordinates based on the origin that is set at the upper left corner of the tile. In this case, setting is done to start rendering of the character string (XXXX) from a position (0,5). C15 indicates the end of the rendering command sequence 1704 of the tile B.

C100 indicates the start of the rendering command sequence 1705 of the tile C in FIG. 16. C101 indicates the filling color of a plane in rendering the graphic of the tile. The color is designated in the same way as for the text color. C102 designates the line color of graphic rendering. C103 indicates the coordinates of the graphic rendering position. C104 is a command to designate the radius of an arc to be rendered. In this case, "10" coordinate units are designated. C105 designates rendering of a closed arc with the radius designated by C104. The two parameters in the command indicate the rendering start angle and end angle in rendering an arc. Vertical information is defined as 0°. C105 here indicates rendering of an arc from 0° to 90°. C106 indicates the end of the rendering command sequence 1705 of the tile C.

C120 to C125 in the rendering command sequence 1707 designate, e.g., the type, color, and size of a font to render a character string, like the commands C9 to C15 in the rendering command sequence 1704 described above. C126 to C131 in the rendering command sequence 1708 designate, e.g., the plane and line colors and the position in rendering a graphic, like C100 to C106 in the rendering command sequence 1705. C500 indicates the end of the page, i.e., the end of the command.

The tile/page vector conversion unit 2013 according to the second embodiment converts, e.g., the page vector data shown in FIG. 15 into tile vector data shown in FIG. 17.

Figure 18:
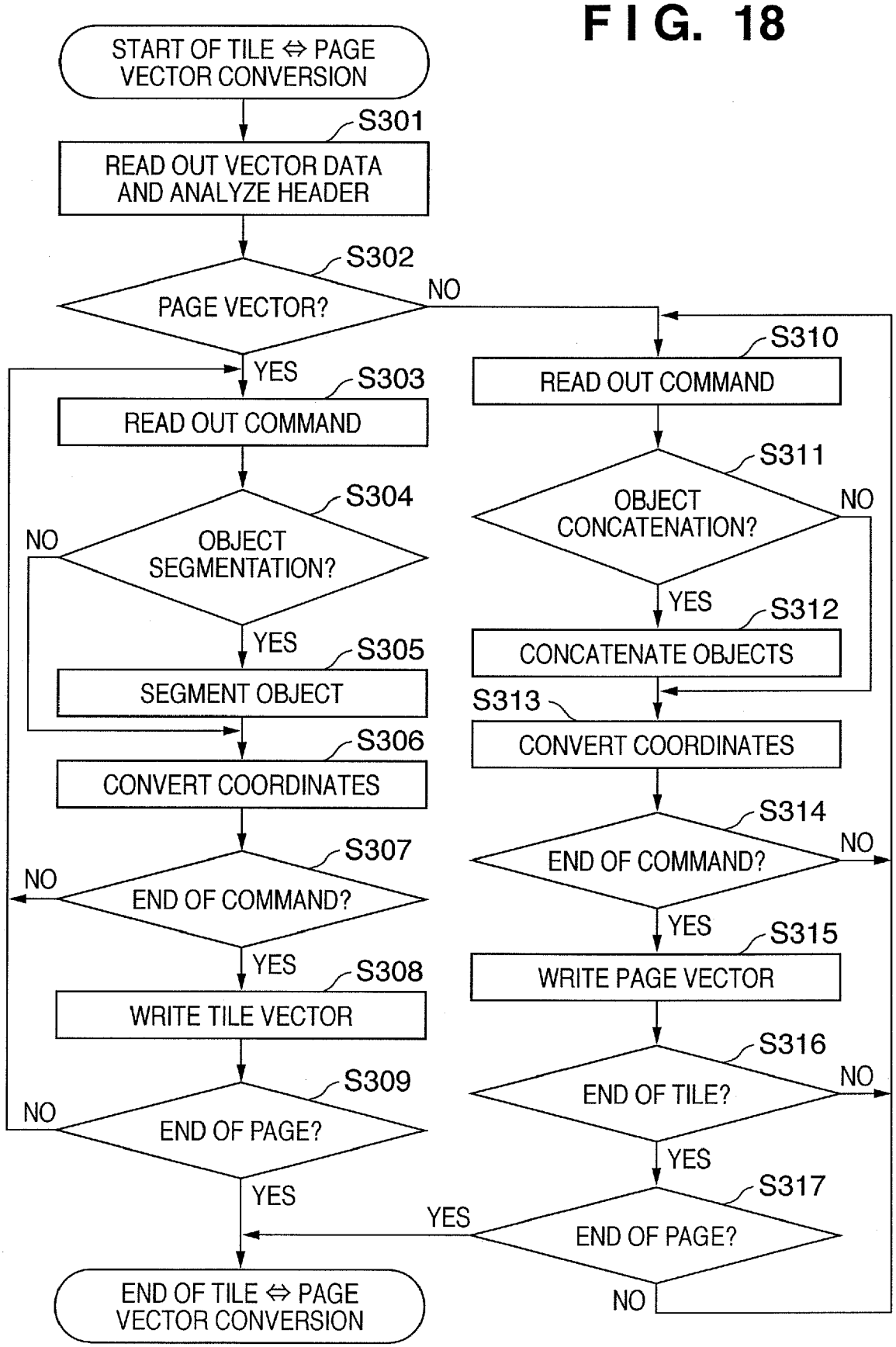
FIG. 18 is a flowchart for explaining a conversion process by a tile/page vector conversion unit according to the second embodiment.

FIG. 18 is a flowchart for explaining a conversion process by the tile/page vector conversion unit 2013 according to the second embodiment. A process of the tile/page vector conversion unit 2013, which is implemented by the CPU 2003 and its control program, will be described.

In step S301, the tile/page vector conversion unit 2013 reads out a command sequence corresponding to a header field from a vector image stored in the memory 2005 and analyzes a command part related to the whole document. This is a process of reading out and processing the command sequence C1 to C5 in FIG. 15 or 17 described above. In step S302, it is determined on the basis of the analysis result whether the document data type is "page vector" (PAGE). If the document type is "page vector", the process advances to step S303 to convert the page vector data into tile vector data. If the document type is "tile vector" (TILE), the process advances to step S310 to convert tile vector data into page vector data.

In step S303, the tile/page vector conversion unit 2013 reads out a command sequence describing an object. In step S304, the command sequence read out in step S303 is analyzed to determine whether the size of the described object is larger than the desired segmented tile size. If object segmentation is unnecessary, the process skips step S305 and advances to step S306. If object segmentation is necessary, the process advances to step S305 to segment the received object.

For example, the character rendering command 1502 in FIG. 15 describes the rendering commands of all character strings including the character string "XXXX . . . ". When the data is segmented into tiles, as shown in FIG. 16, the tile B can contain only four characters "XXXX". In tile vector data, the character string is segmented into blocks (tiles). A succeeding character string that fits in another tile is described as another character string in the next tile. If even the next tile cannot completely contain the character string, the character string is further segmented. This process is repeated until the tiles contain all segmented character strings. Where to segment a character string is determined by calculating the number of characters that fits in a tile on the basis of the font type and size. A character string is segmented on the basis of the number of characters that fits in a tile. When the page vector data shown in FIG. 15 is segmented, as shown in FIG. 16, the number of characters to be contained in a tile is determined as four. The character string represented by C11 in FIG. 15 is converted into the description of C14 in FIG. 17 as a tile vector B.

The command 1503 in FIG. 15 describes rendering of a graphic. In the graphic described by C17 to C21 in the command 1503, the ¾ circle in FIG. 14 cannot fit in a tile in FIG. 16. For this reason, the ¾ circle is segmented into a plurality of tiles including the tile D. In this graphic segmentation, portions that contact the boundary parts of tiles are calculated on the basis of the rendering position, shape, and size of the graphic. A closed region defined by the boundaries and a partial region of the graphic fitted in a tile is re-described as a new graphic. Of the ¾ circle described by the command 1503 in FIG. 15, the lower left partial region is converted into a description of a ¼ circle designated by C126 to C130 in the command 1708 in FIG. 17. Each of the remaining regions is also converted into a description of a ¼ circle with a similar shape.

The process advances to step S306 to convert a coordinate position in the command description of the received object into the rendering position in the tile vector. In the page vector, a position is described from the upper left corner of the page. In the tile vector, however, the position is re-described to position information based on the origin set at the upper left corner of a tile. When a rendering position is described by coordinates in each tile, the data length in coordinate calculation can be short. This shortens the time required for position calculation. When command description conversion of one object is ended, the process advances to step S307 to determine whether command description conversion of all objects in the page is ended. If NO in step S307, the process returns to step S303 to repeat the process in steps S303 to S307 for the next command. If the command process of one object finishes, the process advances to step S308.

When description conversion of all rendering commands is ended, in step S308, the tile vector data of the segmented tile regions in FIG. 16 are written in the memory 2005 sequentially from the upper left corner of the page. A tile vector is described in a format that adds commands indicating the start and end of a tile to the commands described in steps S305 and S306.

More specifically, in writing the first command of the page, a tile vector containing no object is generated in the memory 2005. As a tile vector having no object, for example, the tile A in FIG. 17 is described by only the commands C7 and C8 indicating the start and end in the command sequence 1703. Next, an object description is added to a tile at coordinates where the commands processed in steps S303 to S307 exist. For example, tile B is described by C9 to C15 in the command sequence 1704 in FIG. 17. If a plurality of objects are present in a single tile, like the tile D, the object description of the command 1707 and the object description of the command 1708 continue in order as in the command sequence 1706 in FIG. 17. When one object is written in a tile vector, the process advances to step S309 to determine whether all objects in the page are described. If NO in step S309, the process returns to step S303. If YES in step S309, the conversion process from page vector data to tile vector data is ended.

If it is determined in step S302 that the document type is "tile" (TILE), the process advances to step S310 to read out a command sequence describing an object. The process advances to step S311 to analyze the command sequence read out in step S310 and determine whether the described object can be concatenated to a precedingly readout tile. If object concatenation should not be executed, the process skips step S312 and advances to step S313. If object concatenation should be done, the process advances to step S312. Whether to concatenate the object is determined in step S311 on the basis the coordinate position and graphic type of the readout command. For a character string, determination is done on the basis of the font size and font type. Basically, concatenation is executed by reversing the procedure in step S305.

The process advances to step S313 to convert a coordinate position in the command description of the received object into the rendering position in the tile vector. As described above, in the tile vector, position information based on the origin set at the upper left corner of a tile is described. In the page vector, however, the information is re-described to position information based on the origin set at the upper left corner of the page. When command description conversion of one object is ended, the process advances to step S314 to determine whether command description conversion of all objects in the tile is ended. If NO in step S314, the process returns to step S310 to repeat the process in steps S310 to S313 for the next command. If the command process of one object finishes, and description conversion of the rendering command is ended, the process advances to step S315 to write the page vector in the memory 2005. A page vector is described in a format that removes commands indicating the start and end of a tile from the commands described in steps S305 and S306 described above.

More specifically, in writing the command described in the first tile in the page, a page vector containing no object is generated in the memory 2005. In the example shown in FIG. 14, the page is described by only C1 to C6 and C22. Then, the description of the object processed in steps S310 to S313 is added. In the example shown in FIG. 15, the description corresponds to C7 to C11 in the command 1502. In this case, the object represents the character string (XXXX . . . YY . . . ). This description changes to the description of an object formed by sequentially concatenating the character strings of the respective tiles described by the command sequences 1704 and 1707 in FIG. 17 in step S312. When one command is written in a page vector, the process advances to step S316 to determine whether all objects in the tile are described. If NO in step S316, the process returns to step S310. If YES in step S316, the process advances to step S317 to determine whether all tiles in the page are described. If NO in step 5317, the process returns to step S310. If YES in step S317, the conversion process from tile vector data to page vector data is ended.

[Explanation of Tile Vector Rasterization Unit (RIP) 2018]

The RIP 2018 in the controller 2001 according to the second embodiment will be described next in detail.

Before the start of an image data process such as copy, printing, or transmission, the local memory 2019 is initialized, and the resolution of each rending object to be created is set. In the second embodiment, the resolution of print data is 600 dpi. By using this value, a print command designated by a unit system such as a point size or mm is converted into a dot count.

Figure 19:
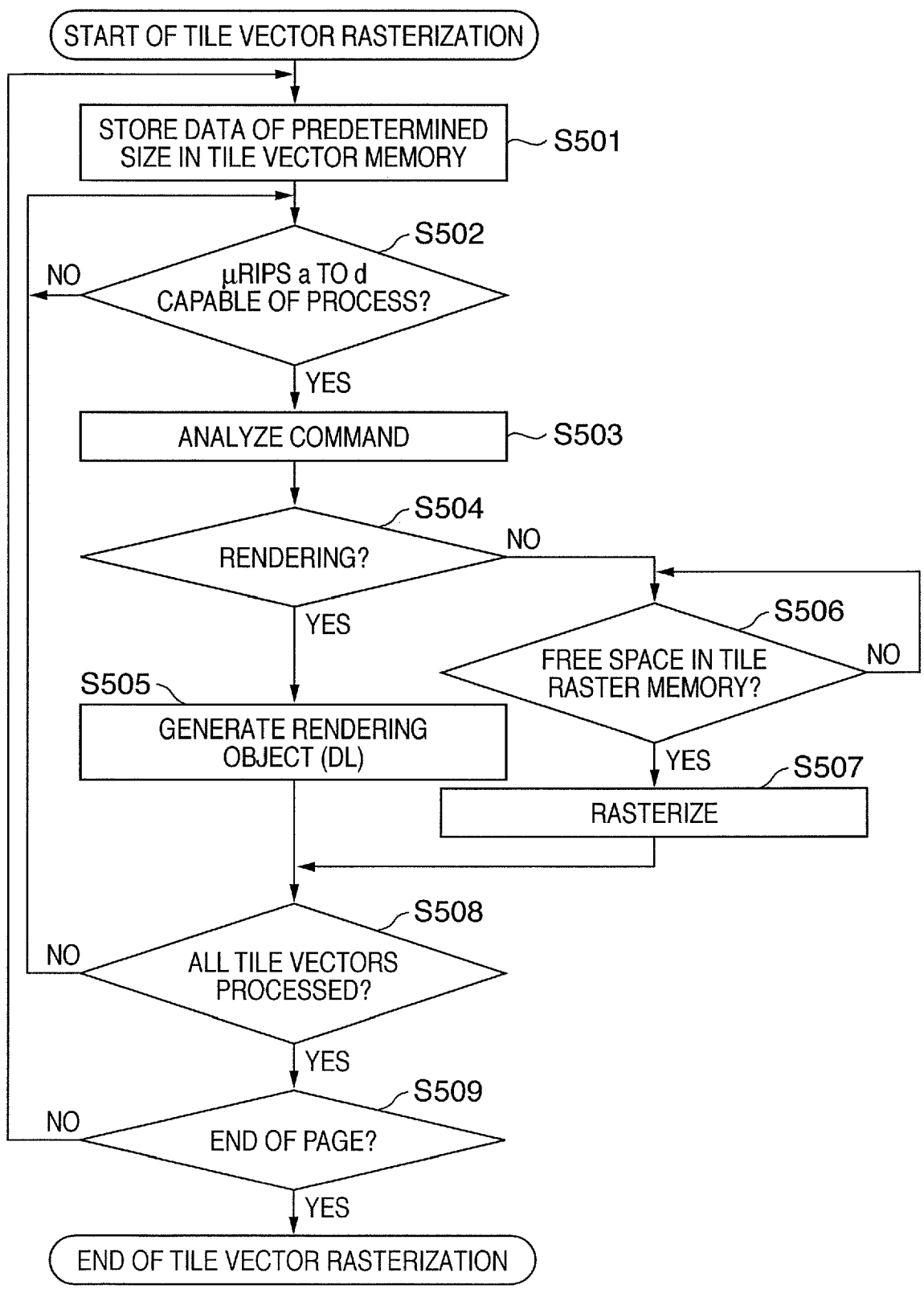
FIG. 19 is a flowchart for explaining a tile vector rasterization process by a RIP according to the second embodiment.

FIG. 19 is a flowchart for explaining a tile vector rasterization process by the RIP 2018 according to the second embodiment.

In step S501, the RIP 2018 receives tile vector data of a predetermined size from the memory 2005 via the SBB 2002. The RIP 2018 temporarily stores the tile vector data in the tile vector area of the local memory 2019. When the local memory 2019 stores the tile vector data, the process advances to step S502. The RIP 2018 determines whether the tile rasterization process is ended in each of the μRIPs $\underline{a}$ to d. If any one of the μRIPs $\underline{a}$ to d is rasterizing vector data, the process waits in step S502 until the GRIP finishes the rasterization process to be able to rasterize data. When the μRIPs $\underline{a}$ to d are enabled to rasterize vector data, the process advances to step S503. The RIP 2018 analyzes the command of the tile vector data stored in the local memory 2019 in accordance with a predetermined grammar.

In step S504, the RIP 2018 determines whether the analyzed command is a rendering command or a discharge command. If the command is determined to be a rendering command, the process advances to step S505 to generate a rendering object (DL). If the command in the tile vector is a character rendering command, a font object is generated on the basis of the font style, font size, and character code designated by the command. If the command is a command to render an object except a text, a rendering object of the graphic (e.g., line, circle, or polygon) designated by the command is generated and stored in a DL area of the local memory 2019. If it is determined that the command indicates print data that is not designated by a rendering command, a process such as print position movement or print environment setting is executed in accordance with the print data. When command analysis of one unit is ended, the process advances to step S508.

If it is determined in step S504 that the command is a discharge command except a rendering command, the process advances to step S506. The RIP 2018 determines whether the tile raster area of the local memory 2019 has a free space. If no free space is present, the process waits until another RIP 2018 finishes the process, and a free space is ensured. If a free space exists in the tile raster memory in step S506, the process advances to step S507. In step S507, the RIP 2018 reads out the rendering object generated in step S505 and renders (rasterizes) it in the tile raster area. If the resolution of the target image data is 600 dpi, the object is rasterized in the tile raster area as image data of 600 dpi. The rendered tile raster image is output to the image processing unit 2015 via the SBB 2002.

When command analysis or rendering of one tile vector is ended in step S505 or S507, the process advances to step S508. In step S508, the RIP 2018 determines whether all of the readout tile vector data are processed. If unprocessed tile vector data remains, the process returns to step S502 to continuously process the next tile vector data. If no unprocessed tile vector data remains, the process advances to step S509. In Step S509, the RIP 2018 determines whether all tile vector data of one page are processed. If unprocessed data remains in the page, the process returns to step S501 to read out tile vector data from the memory 2005 and continue the process. When all tile vector data of one page are processed, the tile vector data rasterization process is ended.

[Object Selection Operation Using Operation Unit 2010]

An operation of displaying a preview of image data stored in the HDD 2008 on the displaying unit of the operation unit 2010 and causing the user to select a predetermined object from the displayed preview image will be described next.

Figure 20:
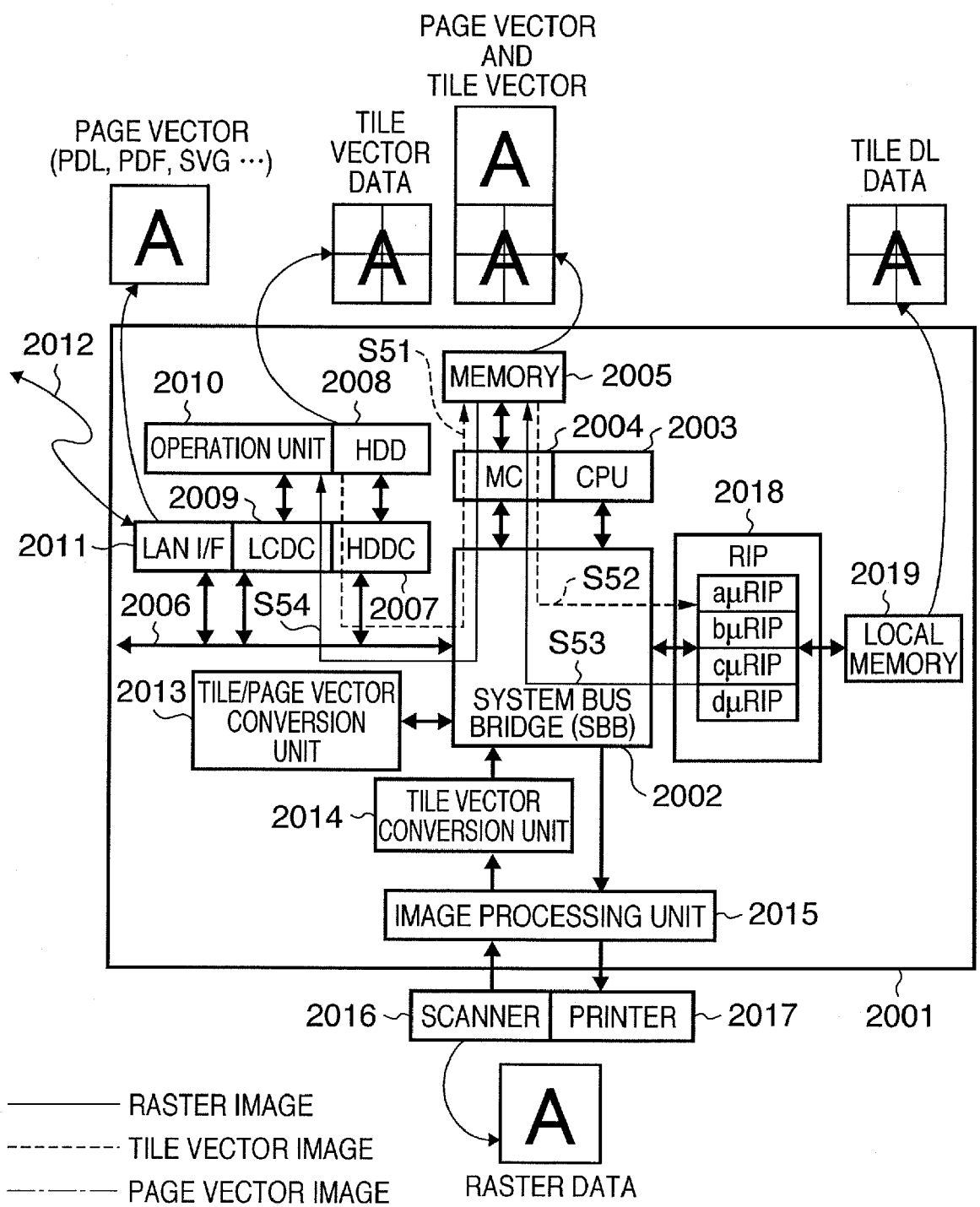
FIG. 20 is a view for explaining the flow of image data in preview display in the MFP according to the second embodiment.

FIG. 20 is a view for explaining the flow of image data in preview display in the MFP according to the second embodiment. The same reference numerals as in FIG. 9 described above denote the same parts in FIG. 20.

First, image data to be displayed on the displaying unit of the operation unit 2010 is spooled from the HDD 2008 to the memory 2005 via the MC 2004 (S51). The data temporarily spooled in the memory 2005 is transferred to the RIP 2018 via the MC 2004 and SBB 2002, and the tile vector data is rasterized (S52). The tile vector data rasterization process has been described above in detail with reference to the flowchart in FIG. 19, and a description thereof will not be repeated. The RIP 2018 also executes scaling of an image to be preview-displayed. The data rasterized by the RIP 2018 is written back in the memory 2005 (S53). The data written back in the memory 2005 is transferred to the operation unit 2010 by using the DMAC function of the LCDC 2009 and displayed on the displaying unit as an image (S54).

To select a target object for a process such as image manipulation, deletion, or saving from the displayed image, the user selects a desired point by using a finger or a pointing device.

Figure 21:
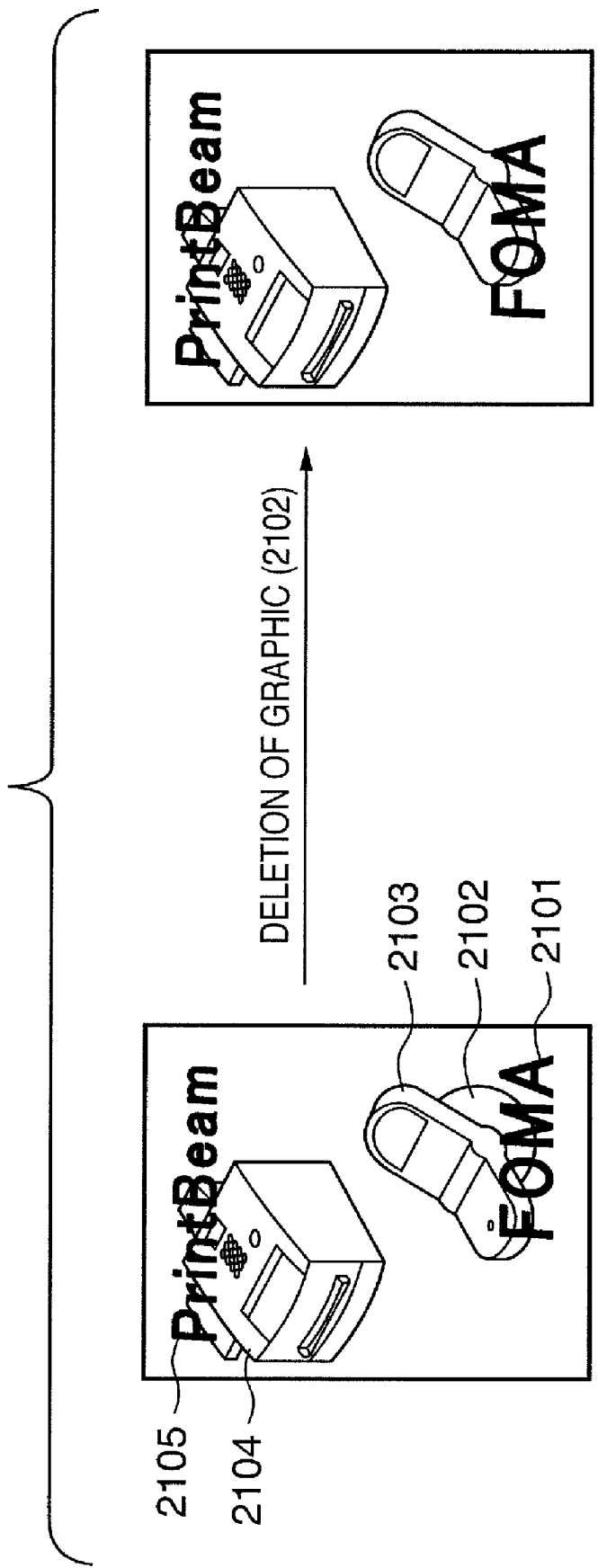
FIG. 21 is a view for explaining deletion of a circle (object 2102) from a display image containing objects 2101 to 2105.

FIG. 21 is a view for explaining deletion of a circle (object 2102) from a display image containing objects 2101 to 2105.

Figure 22:
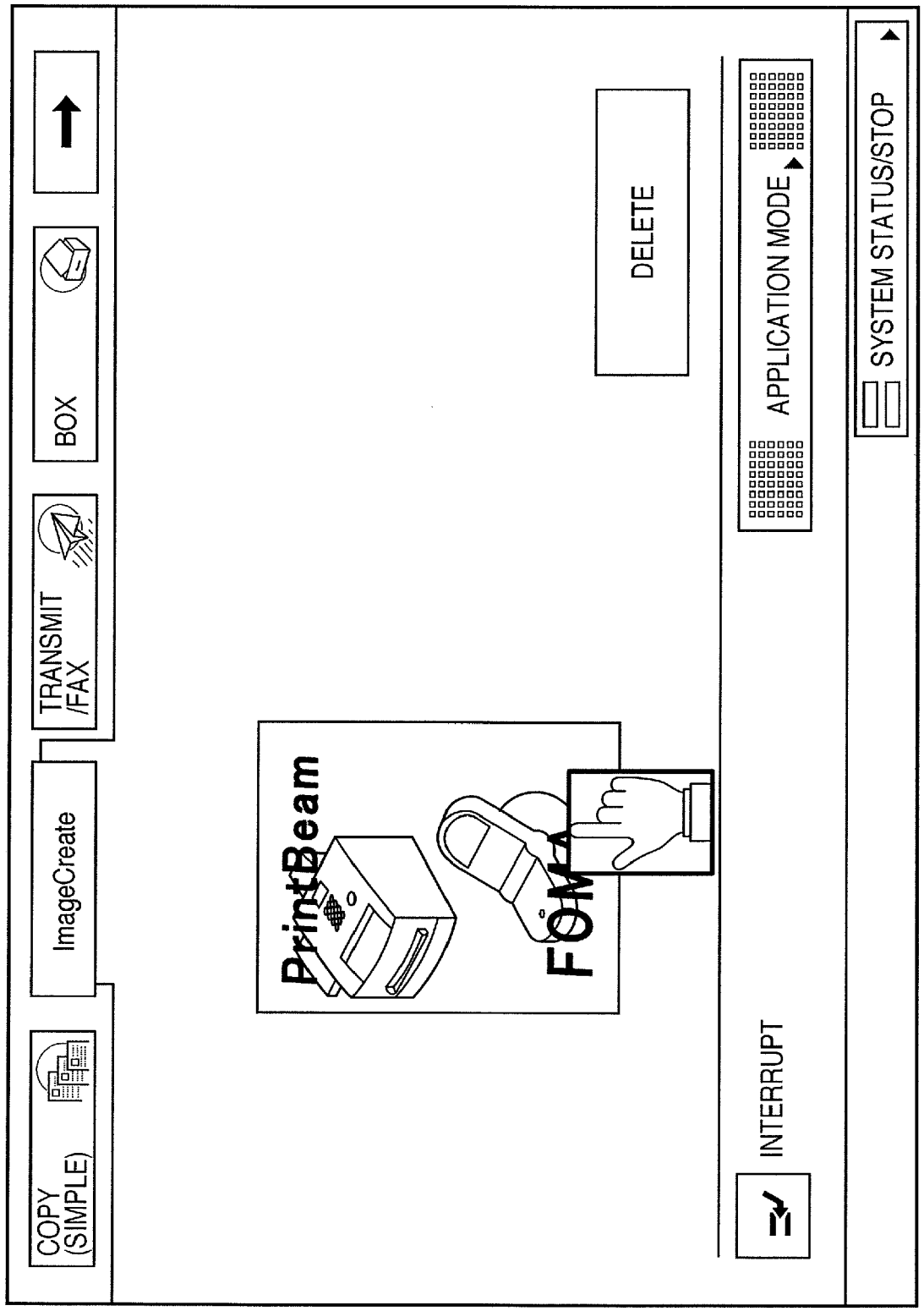
FIG. 22 is a view showing a display example on the displaying unit according to a data flow indicated by S51 to S54 in FIG. 20.
Figure 23:
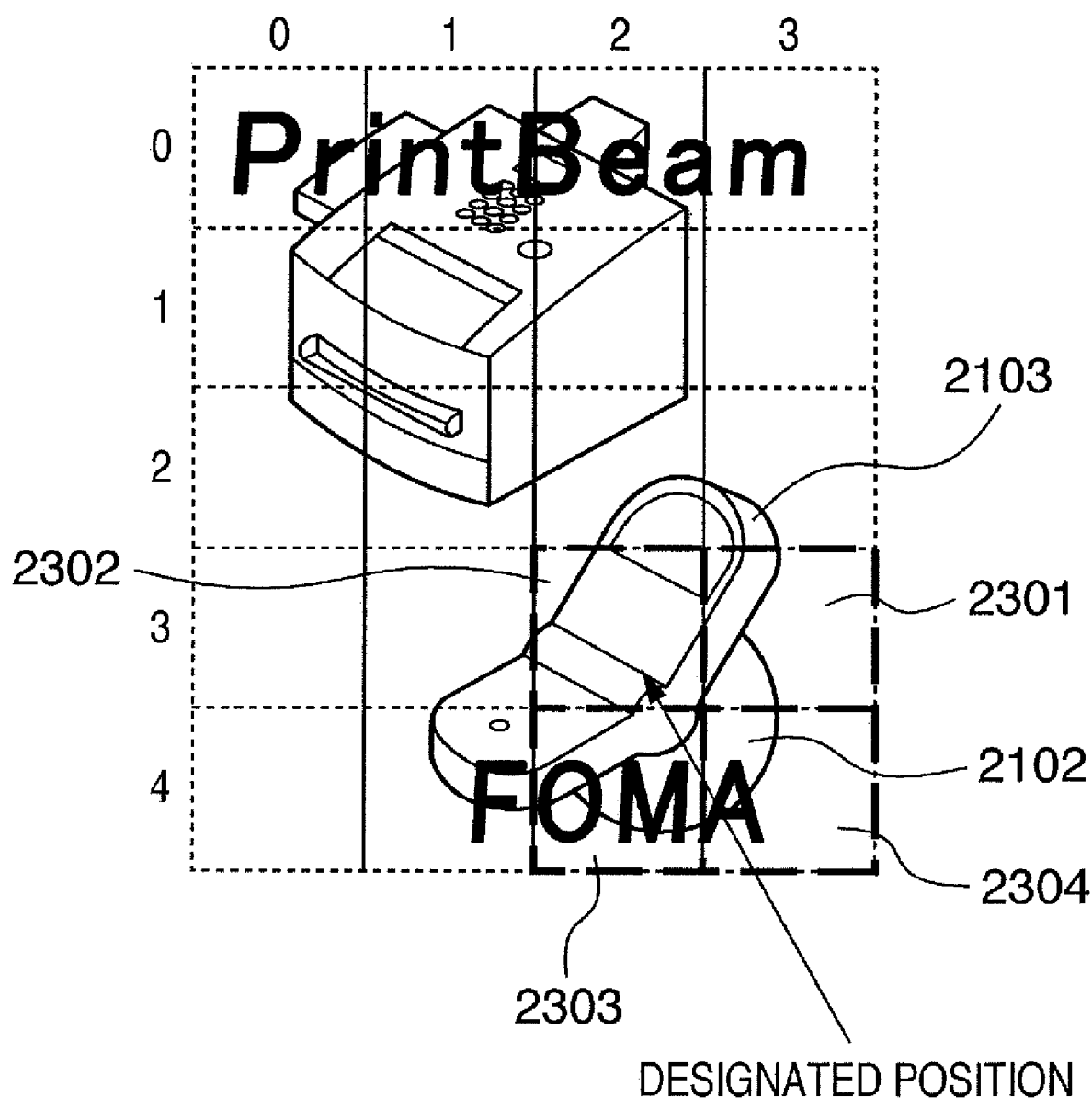
FIG. 23 is an enlarged view of the objects.
Figure 24:
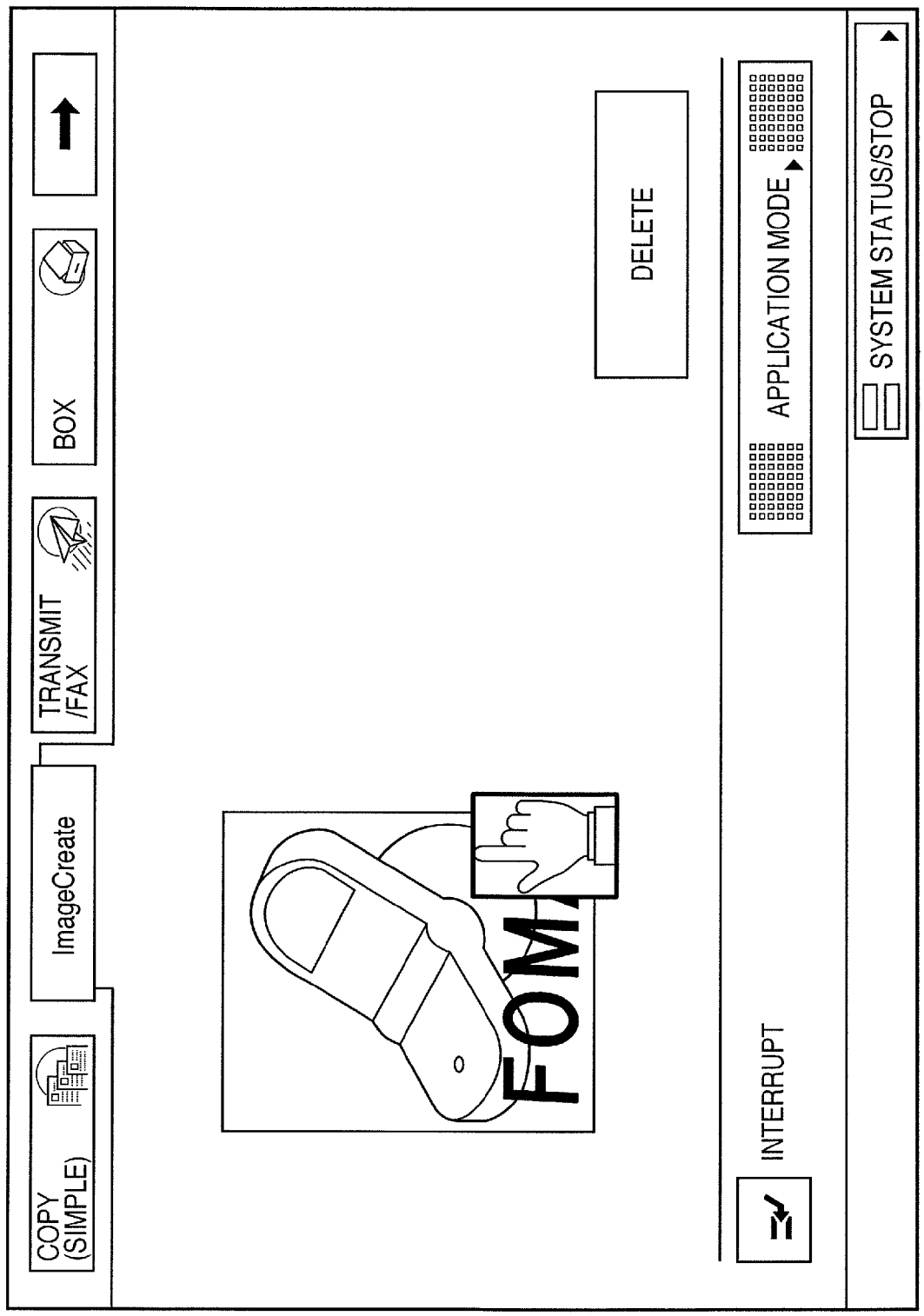
FIG. 24 is a view showing an enlarged display example on the displaying unit of the operation unit.

FIG. 22 is a view showing a display example on the displaying unit according to the data flow indicated by S51 to S54 in FIG. 20. FIG. 23 is an enlarged view of the objects. FIG. 24 is a view showing an enlarged display example on the displaying unit of the operation unit 2010.

Figure 25:
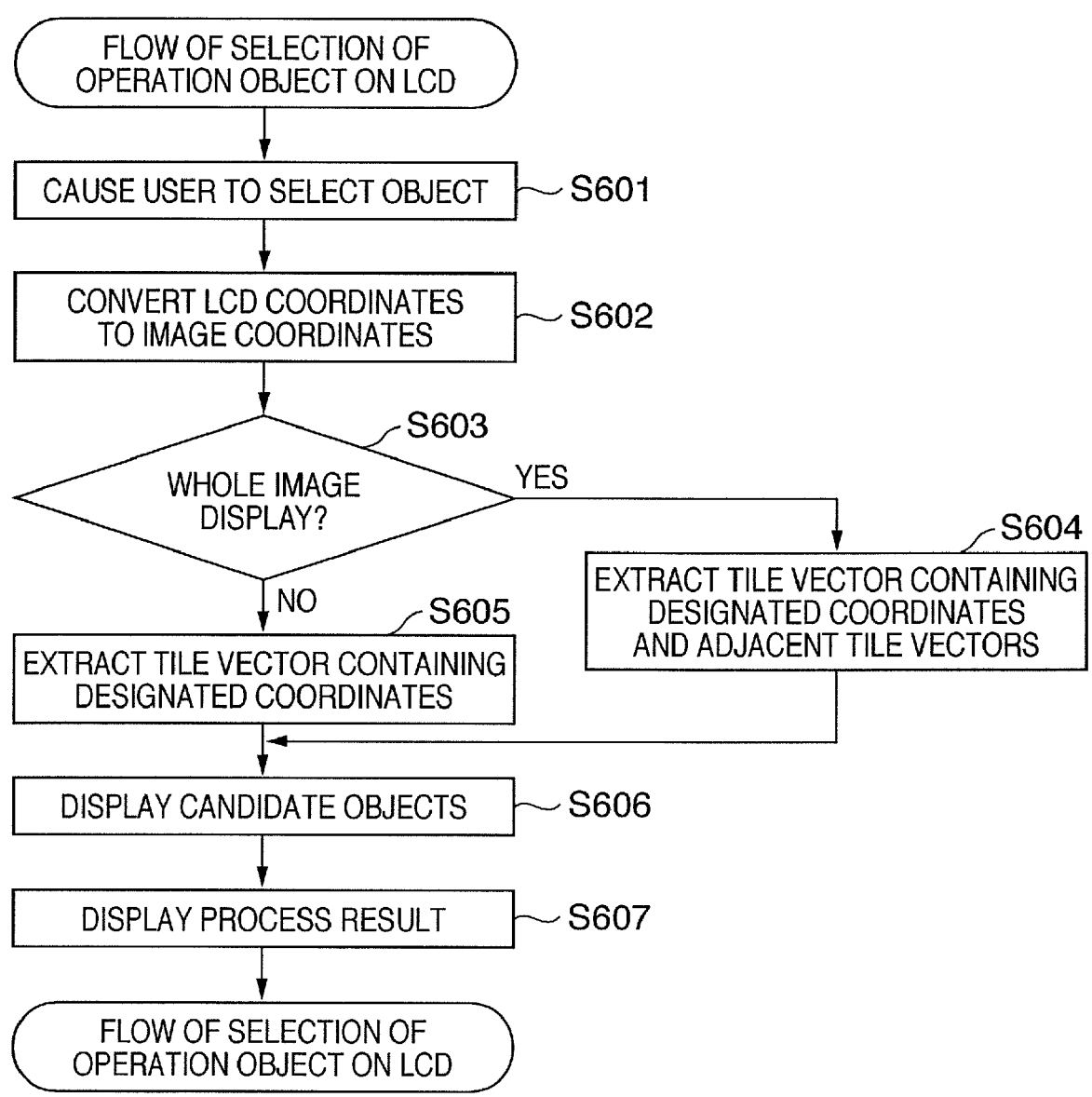
FIG. 25 is a flowchart for explaining an object selection operation using the operation unit according to the second embodiment.

FIG. 25 is a flowchart for explaining an object selection operation using the operation unit 2010 according to the second embodiment.

In step S601, the user designates a desired operation target object using a pointing device or his/her finger. For example, assume that the user wants to designate the graphic object 2102 in FIG. 21. The process advances to step S602. The touch sensor (not shown) of the displaying unit of the operation unit 2010 detects the coordinates of the designated point and outputs the coordinates as an electrical signal. The CPU 2003 converts the coordinate system of the touch sensor into a coordinate system for a page raster image. In step S603, an extraction tile to extract a tile vector including the selected point is determined on the basis of position information of the selected point that has undergone coordinate conversion.

In a whole image display mode as shown in FIG. 22, the objects 2101 to 2103 in FIG. 21 are very close to each other.

For this reason, even when the user has designated the object 2102 in a tile 2301 at coordinates (3,3) in FIG. 23, the sensor may erroneously detect the object 2103 in an adjacent tile at (2,3).

Conversely, in an enlarged image display mode as shown in FIG. 24, the display size of an image corresponding to one tile is large. Hence, the probability that the user designates a wrong tile in the vicinity is low. In step S603, it is checked whether a whole image is displayed on the operation unit 2010. If YES in step S603, the process advances to step S604. Otherwise, the process advances to step S605. In step S604, not only vector data of the tile (2,3) 2302 containing the selected point but also the adjacent tiles (3,3) 2301, (2,4) 2303, and (3,4) 2304 are defined as selection target tiles, and their vector data are also extracted.

If NO in step S604, the process advances to step S605 to extract only the tile vector (3,3) including the designated coordinates, as shown in FIG. 26. In step S606, the displaying unit displays only objects contained in the tile vector data extracted in step S604 or S605 to cause the user to select a desired object. The process advances to step S607 to execute a desired process (deletion in this embodiment) for the selected object. The displaying unit displays the process result for confirmation. After the user confirms that the process has properly been executed, the process is ended.

In the second embodiment, the number of tiles to be selected is four in whole image display mode or one in the enlarged image display mode. The number of tiles to be selected may change in multiple levels depending on the display magnification.

Third Embodiment

In the above-described second embodiment, when the user designates a position on an image, the number of tiles to be selected changes depending on the display magnification. However, the number of tiles may change depending on the type of pointing device. For example, in the second embodiment, the user designates an object on the touch panel of the operation unit 2010 by using a finger. Examine a case wherein the user uses a coordinate pointing device such as a pen, as shown in FIG. 27.

Figure 27:
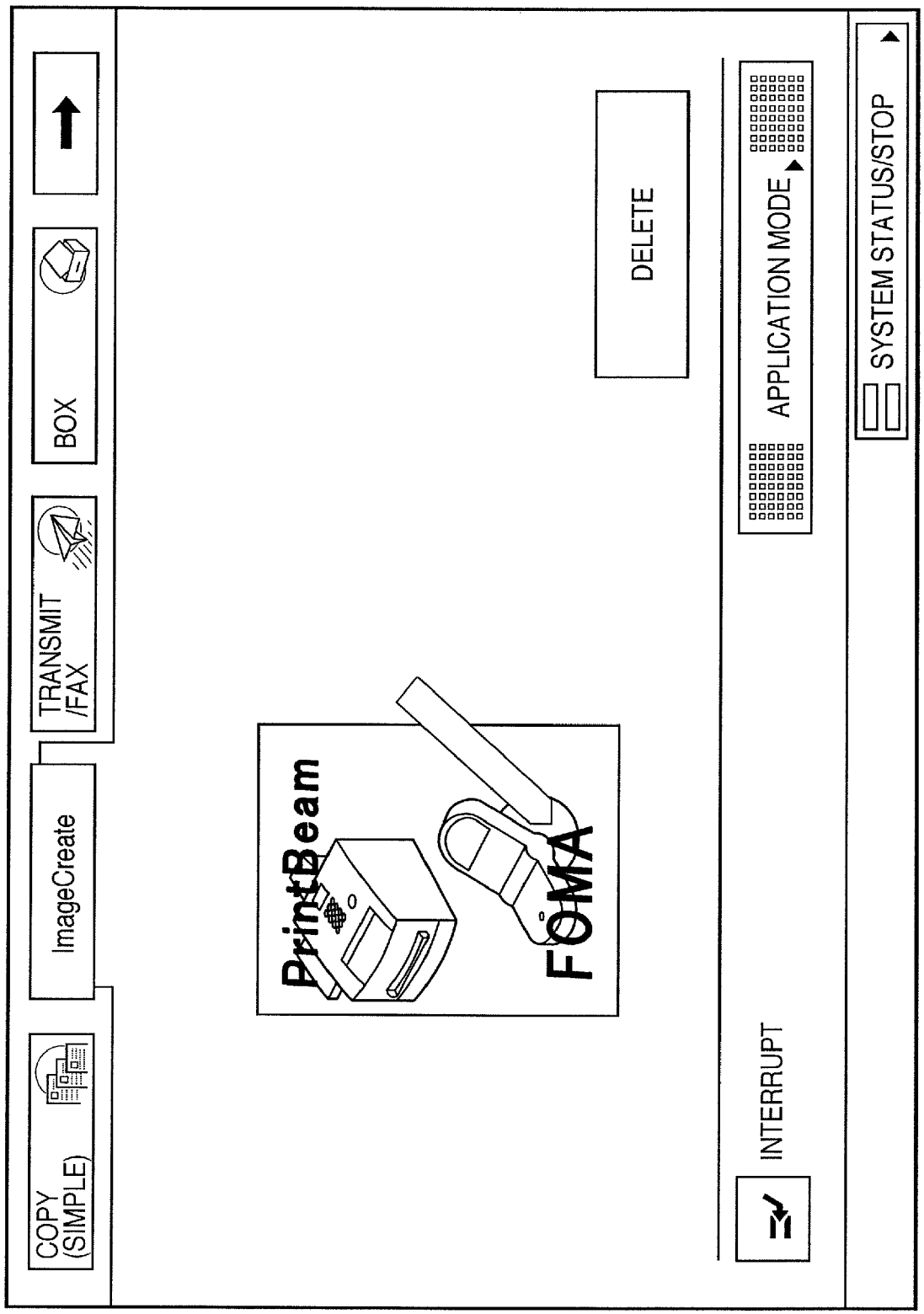
FIG. 27 is a view showing a state wherein the user designates a position on the screen by using a coordinate pointing pen (coordinate pointing device) in the third embodiment of the present invention.

FIG. 27 is a view showing a state wherein the user designates a position on the screen by using a coordinate pointing pen (coordinate pointing device) in the third embodiment of the present invention.

In this case, even when the displaying unit is displaying a whole image, a small area is pressed. Supposedly, the user can accurately designate the position of a predetermined object by the coordinate pointing device. Hence, only a tile corresponding to the designated position is selected.

FIG. 28 shows this state.

In this case, since the number of tiles to be selected need not be more than necessary, the time required for object designation can shorten.

The pointing device can be changed by user designation. Even a finger size varies between users. Hence, the number of search tiles may be set relatively large in Western countries and relatively small in Asian countries.

As described above, according to the second and third embodiments, since the number of object search tiles changes depending on the magnification of an image displayed on the displaying unit, it is possible to accurately designate an object.

When the number of search tiles is optimally set depending on the pointing device, the user can designate an object as quickly as possible.

Other Embodiments

The embodiments of the present invention have been described above in detail. The present invention is applicable to a system including a plurality of devices or an apparatus including a single device.

The present invention is also achieved by supplying a software program to implement the functions of the above-described embodiments to the system or apparatus directly or from a remote site and causing the computer of the system or apparatus to read out and execute the supplied program. The form need not always be a program as far as the function of a program is available.

Hence, the program codes themselves which are installed in a computer to implement the functional processing of the present invention also implement the present invention. That is, the claims of the present invention also incorporate the computer program itself to implement the functional processing of the present invention. In this case, the program can take any form such as an object code, a program to be executed by an interpreter, or script data to be supplied to the OS as long as the function of the program is available.

Examples of a recording medium to supply the program are a Floppy® disk, hard disk, optical disk, magnetooptical disk, MO, CD-ROM, CD-R, CD-RW, magnetic tape, nonvolatile memory card, ROM, and DVD (DVD-ROM and DVD-R).

The following program supply method is also available. A client computer may connect to a homepage on the Internet via a browser to download the program from the homepage to a recording medium such as a hard disk. The computer program itself of the present invention or a compressed file including an automatic installation fiction may be downloaded. The program codes contained in the program of the present invention may be divided into a plurality of files so that the user can download the files from different homepages. That is, a WWW server which causes a plurality of users to download the program file to implement the functional processing of the present invention is also incorporated in the claims of the present invention.

The program of the present invention may be encrypted, stored in a storage medium such as a CD-ROM, and distributed to users. Any user who satisfies predetermined conditions can download key information to decrypt the program from a homepage through the Internet. The user can install, in the computer, the encrypted program in an executable form by using the key information.

The functions of the above-described embodiments are implemented by a form except when the computer executes the readout program. The functions of the above-described embodiments are also implemented when, e.g., the OS running on the computer partially or wholly executes actual processing on the basis of the instructions of the program.

The program read out from the recording medium may be written in the memory of a function expansion board inserted into the computer or a function expansion unit connected to the computer. In this case, the CPU of the function expansion board or function expansion unit partially or wholly executes actual processing on the basis of the instructions of the program to implement the functions of the above-described embodiments.

According to the present invention, it is possible to easily select a desired object from an image containing a plurality of objects.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-186973, filed on Jul. 6, 2006, which is hereby incorporated by reference herein in its entirety.

What is claimed is:

1. An image processing apparatus which forms an image by rendering an image containing a plurality of objects, said image processing apparatus comprising:
    a displaying unit adapted to display the image containing the plurality of objects;
    an extracting unit adapted to extract objects corresponding to a position designated on the image displayed on said displaying unit;
    an extraction image displaying unit adapted to lay out and display individual images corresponding to the objects extracted by said extracting unit; and
    a selecting unit adapted to select one of the individual images which are laid out and displayed,
    wherein image data of the image is vectorized and divisionally stored in a plurality of tile regions, and
    wherein said extracting unit extracts objects contained in at least one of a tile region at the position designated on the image or adjacent tile regions to the designated position.

2. The apparatus according to claim 1, further comprising an image processing unit adapted to execute image processing for the object corresponding to the individual image selected by said selecting unit.

3. The apparatus according to claim 1, wherein said extracting unit changes the tile regions to be extracted in accordance with a display mode of the image on the displaying unit.

4. The apparatus according to claim 1, wherein said extracting unit changes the tile regions to be extracted in accordance with a type of a coordinate pointing device to designate the position.

5. A control method of an image processing apparatus, including a display unit, which forms an image by rendering an image containing a plurality of objects, said control method comprising the steps of:
    displaying the image containing the plurality of objects on the display unit;
    extracting objects corresponding to a position designated on the image displayed on the display unit;
    displaying, on the display unit, individual images corresponding to the objects extracted in the extracting step; and
    selecting one of the individual images which are displayed on the display unit,
    wherein image data of the image is vectorized and divisionally stored in a plurality of tile regions, and
    wherein the extracting step extracts objects contained in at least one of a tile region at the position designated on the image or adjacent tile regions to the designated position.

6. The method according to claim 5, further comprising the step of executing image processing for the object corresponding to the individual image selected in the selecting step.

7. The method according to claim 5, wherein the extracting step changes the tile regions to be extracted in accordance with a display mode of the image in the displaying step.

8. The method according to claim 5, wherein the extracting step changes the tile regions to be extracted in accordance with a type of a coordinate pointing device to designate the designated position.

* * * * *